United States Patent
Hioka

(10) Patent No.: US 9,765,706 B2
(45) Date of Patent: Sep. 19, 2017

(54) CONTROLLER FOR INTERNAL COMBUSTION ENGINE

(71) Applicant: Toyota Jidosha Kabushiki Kaisha, Toyota-shi, Aichi-ken (JP)

(72) Inventor: Eiichi Hioka, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 153 days.

(21) Appl. No.: 14/960,927

(22) Filed: Dec. 7, 2015

(65) Prior Publication Data
US 2016/0169124 A1    Jun. 16, 2016

(30) Foreign Application Priority Data
Dec. 10, 2014    (JP) .................. 2014-250017

(51) Int. Cl.
*F01L 1/34*    (2006.01)
*F02D 13/02*    (2006.01)
(Continued)

(52) U.S. Cl.
CPC .......... *F02D 13/0207* (2013.01); *F01L 1/344* (2013.01); *F01L 13/0063* (2013.01); *F02D 35/0007* (2013.01); *F02D 41/221* (2013.01); *F02D 41/263* (2013.01); *F01L 1/185* (2013.01); *F01L 1/2405* (2013.01); *F01L 1/267* (2013.01);
(Continued)

(58) Field of Classification Search
CPC ..... F02D 2041/2058; F01L 1/267; F01L 1/34; F01L 1/344; F01L 2820/032; F01L 2820/041; F01L 2820/045; F01L 2800/11; F01L 2800/14; F01L 2013/111; F01L 2013/118
USPC ........ 123/90.15–90.18, 345, 346; 73/114.79; 701/114
See application file for complete search history.

(56) References Cited

U.S. PATENT DOCUMENTS

| | | | | |
|---|---|---|---|---|
| 7,761,217 B2 * | 7/2010 | Waters | ........... | F01L 1/185 123/90.16 |
| 8,621,917 B2 * | 1/2014 | Fedewa | ........... | F01L 1/267 73/114.79 |

(Continued)

FOREIGN PATENT DOCUMENTS

| | | |
|---|---|---|
| JP | 2009-299503 A | 12/2009 |
| JP | 2011-149325 A | 8/2011 |
| JP | 2012-246780 A | 12/2012 |

*Primary Examiner* — Erick Solis
(74) *Attorney, Agent, or Firm* — Dinsmore & Shohl LLP

(57) ABSTRACT

A controller for controlling an internal combustion engine includes a valve timing adjuster, a variable valve lift mechanism and a processor. The processor controls a duty cycle of a drive signal in a selected one of control modes, thereby changing a relative rotational phase of a camshaft relative to an engine output shaft. The control modes include a specific control mode in which the duty cycle of the drive signal is adjusted to change a value of the current through a first motor. The processor performs, when changing the relative rotational phase through execution of the specific control mode, an abnormality diagnosis for the variable valve lift mechanism based on a comparison between the current value at the first motor and a reference current value. The processor sets the reference current value in accordance with a rotation angle of the output shaft of a second motor.

18 Claims, 10 Drawing Sheets

(51) Int. Cl.
*F02D 35/00* (2006.01)
*F02D 41/26* (2006.01)
*F02D 41/22* (2006.01)
*F01L 1/344* (2006.01)
*F01L 13/00* (2006.01)
F02D 41/00 (2006.01)
F02D 41/20 (2006.01)
F01L 1/18 (2006.01)
F01L 1/24 (2006.01)
F01L 1/26 (2006.01)

(52) U.S. Cl.
CPC ....... *F01L 2105/00* (2013.01); *F01L 2800/00* (2013.01); *F01L 2800/11* (2013.01); *F01L 2800/14* (2013.01); *F01L 2820/032* (2013.01); *F02D 2041/001* (2013.01); *F02D 2041/2027* (2013.01); *F02D 2041/2058* (2013.01); *Y02T 10/18* (2013.01); *Y02T 10/40* (2013.01)

(56) References Cited

U.S. PATENT DOCUMENTS

| | | | |
|---|---|---|---|
| 2006/0219197 A1* | 10/2006 | Machida | F01L 1/34403 123/90.16 |
| 2009/0088892 A1* | 4/2009 | Shimizu | F01L 13/0026 700/213 |
| 2011/0132327 A1* | 6/2011 | Aso | F01L 1/185 123/436 |
| 2011/0178694 A1 | 7/2011 | Ito | |
| 2016/0348603 A1* | 12/2016 | Mikawa | F02D 41/009 |

* cited by examiner

CONTROLLER FOR INTERNAL COMBUSTION ENGINE

CROSS-REFERENCE TO RELATED APPLICATIONS

The present application claims priority to Japanese Patent Application No. 2014-250017, filed on Dec. 10, 2014, the entire contents of which are incorporated herein by reference.

BACKGROUND

The present disclosure relates to a controller for controlling an internal combustion engine that includes a valve timing adjuster, which adjusts the rotational phase of the camshaft relative to that of the engine output shaft, and a variable valve lift mechanism, which changes the maximum valve lift and the opening duration of engine valves.

Japanese Laid-Open Patent Publication No. 2011-149325 discloses one example of such a controller for controlling an internal combustion engine that includes a valve timing adjuster, which adjusts the rotational phase of the camshaft relative to that of the engine output shaft, and a variable valve lift mechanism, which changes the maximum valve lift and the opening duration of engine valves.

For example, the variable valve lift mechanism disclosed in Japanese Laid-Open Patent Publication No. 2012-246780 includes a control shaft that moves in the axial direction based on driving of a motor. A target is attached to the control shaft, and the amount of movement of the target in the axial direction is detected by a sensor. Accordingly, the movement amount of the control shaft, which is the driven amount of the variable valve lift mechanism, is obtained. Through control of the movement amount of the control shaft, the maximum valve lift and the opening duration of engine valves are adjusted.

Some internal combustion engines with variable valve lift mechanisms perform abnormality diagnosis for the variable valve lift mechanisms. Methods for such abnormality diagnosis include a method that compares an estimated value of the movement amount of the control shaft, which is calculated from the driven amount of the motor, with the movement amount of the target, which is detected by a sensor as described above. In this case, however, the sensor and the target must be installed in the variable valve lift mechanism, which increases the costs for the entire engine.

SUMMARY

Accordingly, embodiments described herein provide a controller for an internal combustion engine that is capable of performing abnormality diagnosis for a variable valve lift mechanism without any dedicated sensor for detecting the driven amount of the variable valve lift mechanism.

In accordance with one aspect of the present disclosure, a controller for controlling an internal combustion engine is provided. The engine includes a valve timing adjuster, which adjusts a relative rotational phase, which is a rotational phase of a camshaft relative to an engine output shaft, by using a first motor, and a variable valve lift mechanism, which changes a maximum valve lift of an engine valve by using a second motor. The controller includes a motor sensor, which detects a rotation angle of an output shaft of the second motor, and a processor, which controls a duty cycle of a drive signal delivered to the first motor, thereby driving the valve timing adjuster. When a positive current is supplied to the first motor, an output shaft of the first motor rotates in a first direction, which is a direction for advancing the relative rotational phase. When a negative current is supplied to the first motor, the output shaft of the first motor rotates in a second direction, which is a direction opposite to the first direction. The processor is configured to control the duty cycle of the drive signal in a selected one of a plurality of control modes, thereby changing the relative rotational phase. The plurality of control modes includes a specific control mode in which the duty cycle of the drive signal is adjusted to change a value of the current through the first motor. The processor is configured to perform, when changing the relative rotational phase through execution of the specific control mode, an abnormality diagnosis for the variable valve lift mechanism based on a comparison between the value of the current through the first motor and a reference current value. The processor is configured to set the reference current value in accordance with the rotation angle of the output shaft of the second motor, which is detected by the motor sensor.

In accordance with another aspect of the present disclosure, a controller for controlling an internal combustion engine is provided. The engine includes a valve timing adjuster, which adjusts a relative rotational phase, which is a rotational phase of a camshaft relative to an engine output shaft, by using a first motor, and a variable valve lift mechanism, which changes a maximum valve lift of an engine valve by using a second motor. The controller includes a motor sensor, which detects a rotation angle of an output shaft of the second motor, and a processor, which controls a duty cycle of a drive signal delivered to the first motor, thereby driving the valve timing adjuster. When a positive current is supplied to the first motor, an output shaft of the first motor rotates in a first direction, which is a direction for advancing the relative rotational phase. When a negative current is supplied to the first motor, the output shaft of the first motor rotates in a second direction, which is a direction opposite to the first direction. The processor is configured to control the duty cycle of the drive signal in a control mode to change the relative rotational phase. The processor is configured to perform, when changing the relative rotational phase through execution of the control mode, an abnormality diagnosis for the variable valve lift mechanism based on a comparison between a rate of change of the relative rotational phase and a reference rate-of-change value. The processor is configured to set the reference rate-of-change value in accordance with the rotation angle of the output shaft of the second motor, which is detected by the motor sensor.

Other aspects and advantages of the present disclosure will become apparent from the following description, taken in conjunction with the accompanying drawings, illustrating by way of example the principles described herein.

BRIEF DESCRIPTION OF THE DRAWINGS

The disclosure may best be understood by reference to the following description of some embodiments together with the accompanying drawings in which.

DETAILED DESCRIPTION

Embodiments of the present disclosure will now be described with reference to drawings.

Figure 1:
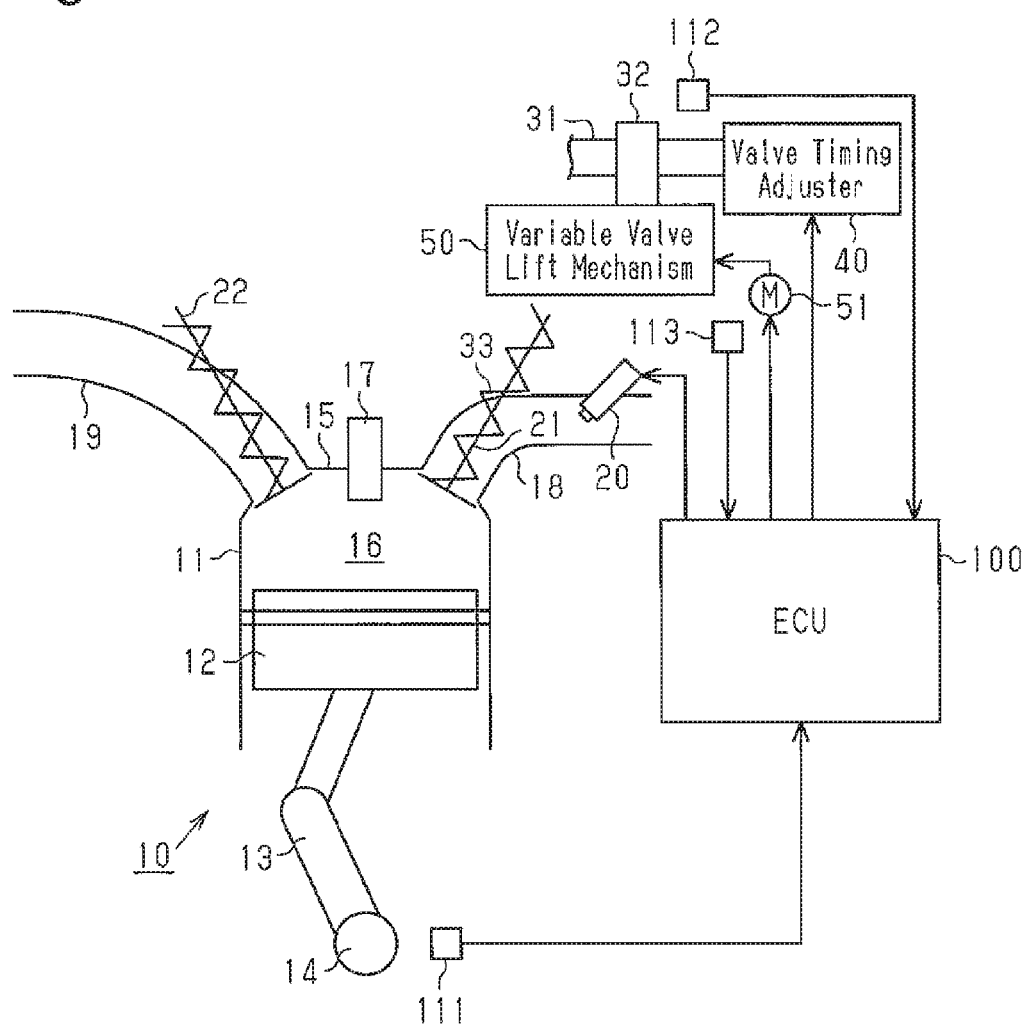
FIG. 1 is a diagram schematically showing the structure of a controller and an internal combustion engine that is controlled by the controller.

FIG. 1 illustrates an internal combustion engine 10 and a controller for the internal combustion engine 10. The controller includes an electronic control unit (ECU) 100, which is a processor or processing circuity including a CPU, memory (RAM, ROM and the like), and an input-output port, none of which is illustrated. FIG. 1 shows a cylinder 11, which is one of the cylinders 11 of the internal combustion engine 10. The cylinders 11 each reciprocally accommodate a piston 12. Reciprocation of the piston 12 is converted into rotation by a connection rod 13 and transmitted to a crankshaft 14. The rotation speed of the crankshaft 14 is detected by a crank position sensor 111. The crankshaft 14 corresponds to an "engine output shaft."

The inner circumferential surface of the cylinder 11, the top of the piston 12, and the cylinder head 15 define a combustion chamber 16. An ignition plug 17 is proved in an upper portion of the combustion chamber 16 to face the piston 12. The combustion chamber 16 is connected to an intake passage 18, through which intake air flows, and an exhaust passage 19, through which exhaust gas discharged from the combustion chamber 16 flows.

A fuel injection valve 20 injects fuel into the intake passage 18. When an intake valve 21, which is an engine valve, is open, air-fuel mixture containing intake air and fuel is supplied to the combustion chamber 16 from the intake passage 18. The air-fuel mixture is burned in the combustion chamber 16 by the ignition plug 17. Thereafter, when an exhaust valve 22, which is an engine valve, is open, exhaust gas is discharged from the combustion chamber 16 to the exhaust passage 19.

The internal combustion engine 10 includes a valve timing adjuster 40 for the intake valves, a camshaft 31, and cams 32, which rotate integrally with the camshaft 31. The valve timing adjuster 40 is configured to adjust the rotational phase of the camshaft 31 relative to the crankshaft 14 (hereinafter, simply referred to as "relative rotational phase"). The relative rotational phase can be calculated based on the rotation speed of the crankshaft 14, which is detected by the crank position sensor 111, and a rotation speed of the camshaft 31, which is detected by a camshaft sensor 112. That is, the crank position sensor 111 and the camshaft sensor 112 form a detection system that detects the relative rotational phase.

The internal combustion engine 10 includes valve springs 33 and a variable valve lift mechanism 50, which varies the maximum valve lift VL and the opening duration (valve opening angle) of each intake valve 21. The valve spring 33 functions as an urging member that urges the intake valve 21 in the valve closing direction. The variable valve lift mechanism 50 is driven by a second motor 51 to adjust the maximum valve lift VL and the opening duration of each intake valve 21. The rotation angle of the output shaft of the second motor 51 is detected by a motor sensor 113.

The valve timing adjuster 40 will now be described with reference to FIG. 2.

Figure 2:
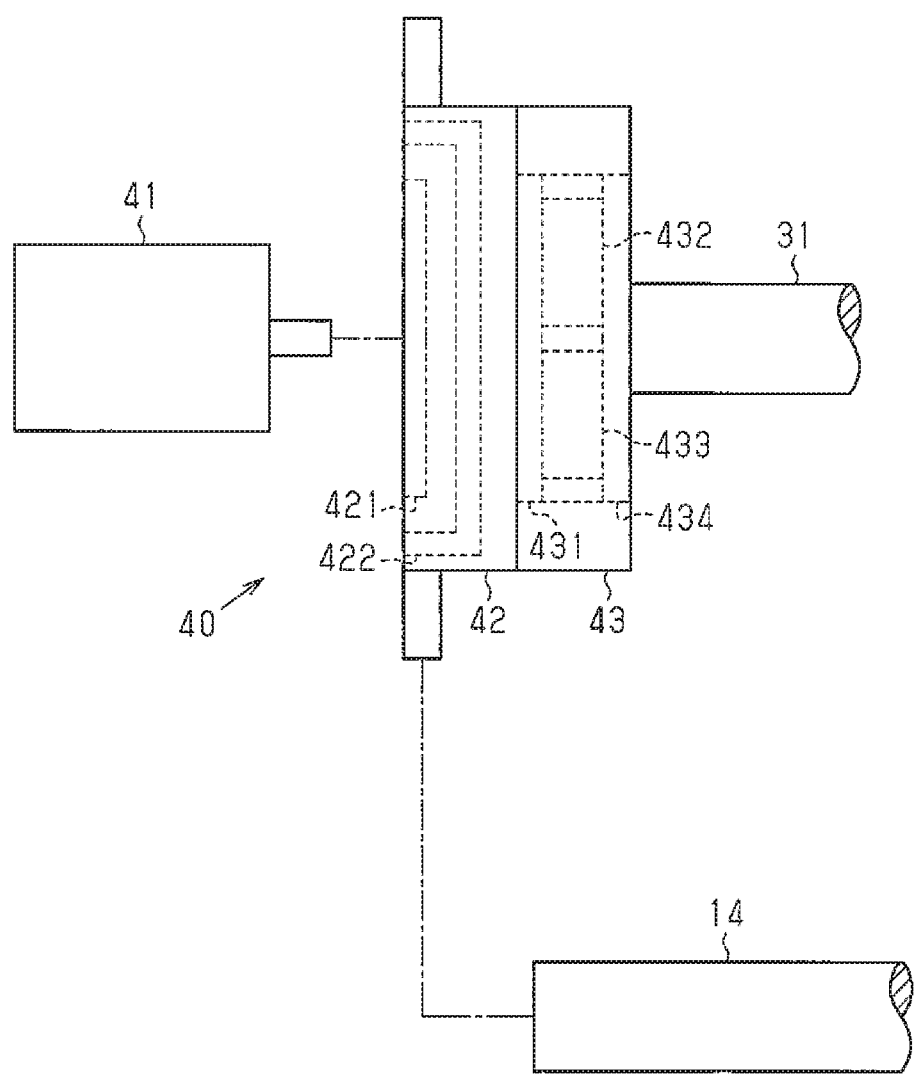
FIG. 2 is a diagram schematically showing the valve timing adjuster of FIG. 1.

As shown in FIG. 2, the valve timing adjuster 40 includes a first motor 41, which is the drive source of the valve timing adjuster 40, a speed reducing mechanism 42, and a link mechanism 43. The speed reducing mechanism 42 and the link mechanism 43 transmit rotation of the crankshaft 14 to the camshaft 31. The output shaft of the first motor 41 rotates in synchronization with rotation of the crankshaft 14 and the camshaft 31.

The first motor 41 is configured to rotate the output shaft in a forward direction, or a first direction, to advance the relative rotational phase (that is, the same direction as the rotation direction of the camshaft 31 in the present embodiment) and in a second direction, which is the direction opposite to the forward direction (the first direction). That is, when a positive current (current having a positive current value) flows through the first motor 41, the output shaft of the first motor 41 rotates in the forward direction. When a negative current (current having a negative current value) flows through the first motor 41, the output shaft of the first motor 41 rotates in the reverse direction. The value Iv of the current through the first motor 41 (hereinafter, referred to as the current value Iv at the first motor) is monitored by a current sensor (not shown).

The speed reducing mechanism 42 has gears 421, 422, which receive rotation of the output shaft of the first motor 41. The gears 421, 422 are meshed with each other to transmit rotation of the first motor 41 to the link mechanism 43 after reducing the speed of the rotation.

The link mechanism 43 has multiple links 431, 432, 433, 434, which are shifted according to increase and reduction of the rotation speed of the first motor 41 transmitted via the speed reducing mechanism 42. Shifting of the links 431 to 434 changes the relative rotational phase.

The valve timing adjuster 40 uses the first motor 41 as the drive source and is driven by controlling the duty cycle of a drive signal to the first motor 41 (hereinafter, simply referred to as a "drive signal duty cycle"). That is, the relative rotational phase is adjusted by controlling the drive signal duty cycle.

Operation of the valve timing adjuster 40 will now be described.

When maintaining the relative rotational phase at a constant value, the drive signal duty cycle is controlled to drive the first motor 41 such that the rotation speed of the camshaft 31 agrees with the rotation speed of the crankshaft 14. At this time, the current value Iv at the first motor 41 is a positive value.

When advancing the relative rotational phase, the drive signal duty cycle is controlled to drive the first motor 41 such that the rotation speed of the camshaft 31 becomes faster than the rotation speed of the crankshaft 14. For example, by changing the drive signal duty cycle from a value that is set when the relative rotational phase is maintained at a constant value, the rotation speed of the camshaft 31 is made faster than the rotation speed of the crankshaft 14. Control of the drive signal duty cycle makes the current value Iv at the first motor 41 greater than the current value when the relative rotational phase is maintained at a constant value. Particularly, in some cases, when the relative rotational phase is set to the most advanced phase, the drive signal duty cycle is maintained at a duty cycle for the upper limit value, and the current value Iv at the first motor 41 may be set to a current upper limit value LimIv, which is greater than zero.

When retarding the relative rotational phase, the drive signal duty cycle is controlled to drive the first motor 41 such that the rotation speed of the camshaft 31 becomes slower than the rotation speed of the crankshaft 14. For example, by changing the drive signal duty cycle from a value that is set when the relative rotational phase is maintained at a constant value, the rotation speed of the camshaft 31 is made slower than the rotation speed of the crankshaft 14. Control of the drive signal duty cycle makes the current value Iv at the first motor 41 less than the current value when the relative rotational phase is maintained at a constant value. That is, the current value Iv is adjusted in a range between zero and the current upper limit value LimIv. Particularly, when the relative rotational phase is set to the most retarded phase, the drive signal duty cycle is maintained at zero.

In some cases, the relative rotational phase is demanded to be retarded rapidly, and the drive signal duty cycle is adjusted such that the current value Iv at the first motor 41 is made less than zero. In such a case, compared to a case in which the current value Iv is adjusted in a range between zero and the current upper limit value LimIv, the difference in rotation speed between the camshaft 31 and the crankshaft 14 is increased rapidly, so that the relative rotational phase is retarded promptly. Particularly, in some cases, when the relative rotational phase is set to the most retarded phase, the drive signal duty cycle is maintained at a duty cycle for the lower limit value, and the current value Iv at the first motor 41 may be set to a current lower limit value LimIvA, which is less than zero.

Next, with reference to FIGS. 3 to 5, the variable valve lift mechanism 50 and components arranged thereabout will be described.

Figure 3:
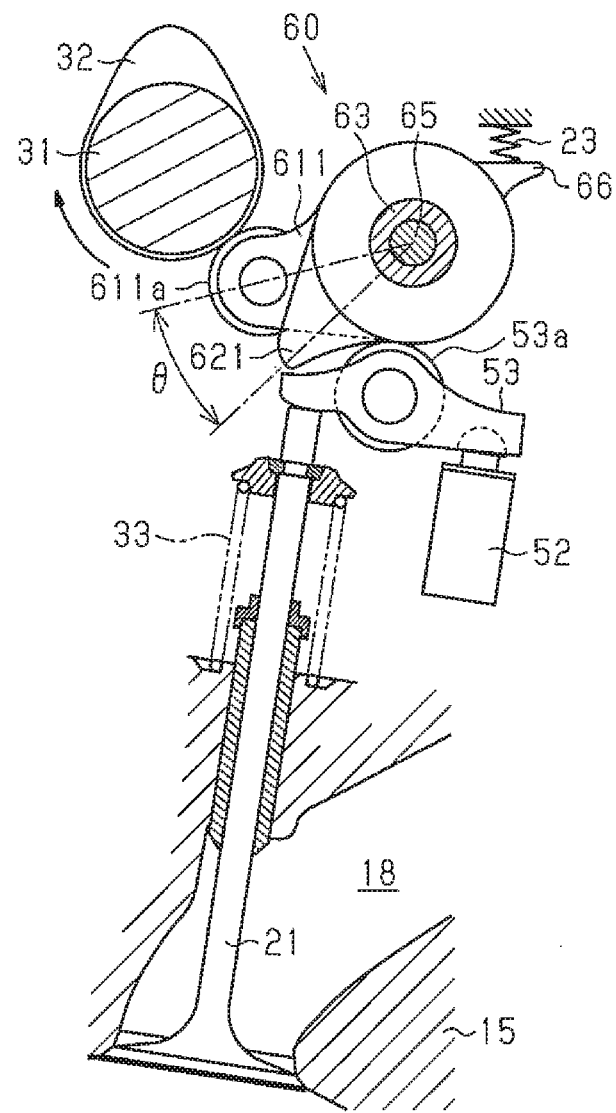
FIG. 3 is a cross-sectional view schematically showing the structure of the variable valve lift mechanism of FIG. 1 and components arranged about the mechanism.

As shown in FIG. 3, a lash adjuster 52 is arranged in the vicinity of each intake valve 21, and a rocker arm 53 is arranged between the lash adjuster 52 and the intake valve 21. One end of the rocker arm 53 is supported by the lash adjuster 52, and the other end is held in contact with an end of the intake valve 21 (the upper end as viewed in the drawing).

A variable actuation mechanism portion 60, which is included in the variable valve lift mechanism 50, is arranged between the rocker arm 53 and the cam 32. The variable actuation mechanism portion 60 has two input arms 611 and two output arms 621. The input arms 611 and the output arms 621 are supported by a support pipe 63, which is fixed to the cylinder head 15, and are pivotal about the support pipe 63. The end of the rocker arm 53 that contacts an end of the intake valve 21 is urged toward the output arms 621 by the urging force of the valve spring 33. The rocker arm 53 has a roller 53a in the middle, which contacts the peripheral surfaces of the corresponding output arm 621.

The variable actuation mechanism portion 60 has a projection 66 on the outer circumferential surface. The projection 66 receives the urging force of a spring 23 located in the cylinder head 15. The urging force of the spring 23 causes a roller 611a, which is located between the input arms 611, to contact the outer circumferential surface of the cam 32. Accordingly, when the camshaft 31 rotates during operation of the engine, the variable actuation mechanism portion 60 pivots about the support pipe 63. Then, each output arm 621 pushes the corresponding rocker arm 53, so that the rocker arm 53 pivots about the part supported by the lash adjuster 52, thereby selectively opening and closing the corresponding intake valve 21.

A control shaft 65 is inserted into the support pipe 63. The control shaft 65 forms a part of the variable valve lift mechanism 50. The control shaft 65 is movable in the axial direction of the control shaft 65 relative to the support pipe 63. When the variable actuation mechanism portion 60 displaces the control shaft 65 in the axial direction, the relative phase difference about the support pipe 63 between the input arms 611 and the output arms 621, or the angle θ indicated in FIG. 3, is changed.

Figure 4:
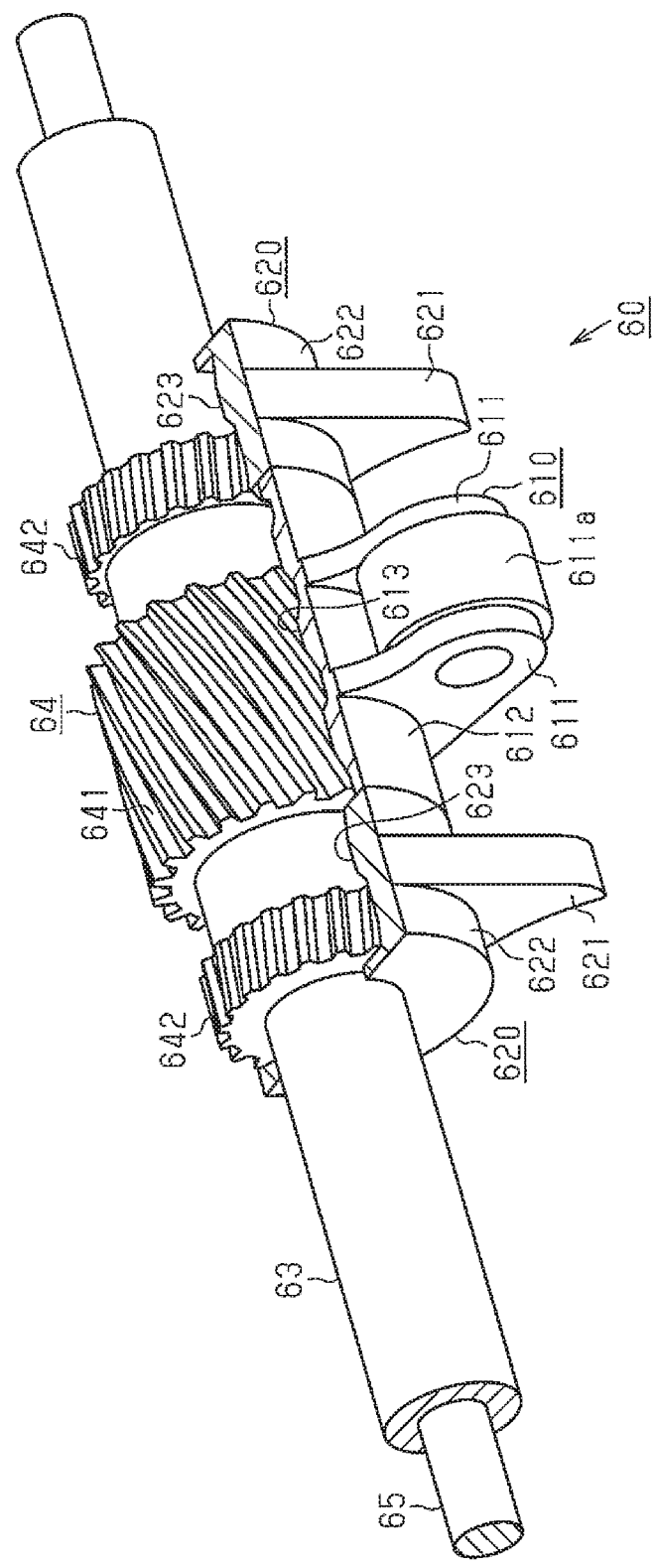
FIG. 4 is a perspective view, with a part cut away, of a variable actuation mechanism portion of the variable valve lift mechanism of FIG. 3.

As shown in FIG. 4, the variable actuation mechanism portion 60 includes an input portion 610 and output portions 620 located on the opposite sides of the input portion 610 in the axial direction of the variable actuation mechanism portion 60. A housing 612 of the input portion 610 and housings 622 of the output portions 620 are formed to have hollow cylindrical shapes, and the support pipe 63 is inserted into the housings 612, 622. A helical spline 613 is formed on the inner circumference of the housing 612 of the input portion 610. Helical splines 623, which have a tooth trace opposite to that of the helical spline 613 of the input portion 610, are formed on the inner circumferences of the housings 622 of the output portions 620.

A hollow cylindrical slider gear 64 is located in a continuous internal space formed by the housings 612, 622 of the input portion 610 and the two output portions 620. In other words, the slider gear 64 is arranged on the outer circumferential surface of the support pipe 63 to be capable of reciprocating in the axial direction of the support pipe 63 and relatively rotating about the axis of the support pipe 63.

A helical spline 641, which meshes with the helical spline 613 of the input portion 610, is formed on the outer circumferential surface of the center portion of the slider gear 64 in the axial direction. Helical splines 642, which mesh with the helical splines 623 of the output portions 620, are formed on the outer circumferential surface of the opposite ends of the slider gear 64 in the axial direction.

The slider gear 64 is engaged with the control shaft 65, which is arranged inside the support pipe 63, via a pin. Thus, the slider gear 64 moves in the axial direction of the control shaft 65 in conjunction with the axial movement of the control shaft 65, while being pivotal with respect to the support pipe 63.

The helical spline 641 has a tooth trace in a different direction from that of the helical splines 642. The helical spline 641, which is formed on the outer circumferential surface of the slider gear 64, is meshed with the helical spline 613, which is formed on the inner circumferential surface of the input portion 610. Each helical spline 642, which is formed on the outer circumferential surface of the slider gear 64, is meshed with the helical spline 623, which is formed on the inner circumferential surface of the corresponding output portion 620. Thus, when the slider gear 64 is moved in the axial direction of the control shaft 65, the input portion 610 and the output portions 620 pivot in opposite directions. As a result, the relative phase difference between the input arms 611 and the output arms 621, so that the maximum valve lift VL and the valve opening duration, which are valve characteristics of the intake valves 21, are changed.

That is, when the control shaft 65 is moved toward one side in the axial direction of the control shaft 65, the relative phase difference between the input arms 611 and the output arms 621, or the angle 0 shown in FIG. 3, is increased as the slider gear 64 moves. As a result, the maximum valve lift VL and the opening duration of the intake valves 21 are both increased to increase the intake air amount into the combustion chambers 16. When the control shaft 65 is moved in a direction opposite to the direction in which the relative phase difference between the input arms 611 and the output arms 621 is increased, that is, in a direction toward the other side in the axial direction of the control shaft 65, the relative phase difference between the input arms 611 and the output arms 621, or the angle 0 in FIG. 3, is decreased as the slider gear 64 moves. As a result, the maximum valve lift VL and the opening duration of the intake valves 21 are both decreased to decrease the intake air amount into the combustion chambers 16.

Figure 5:
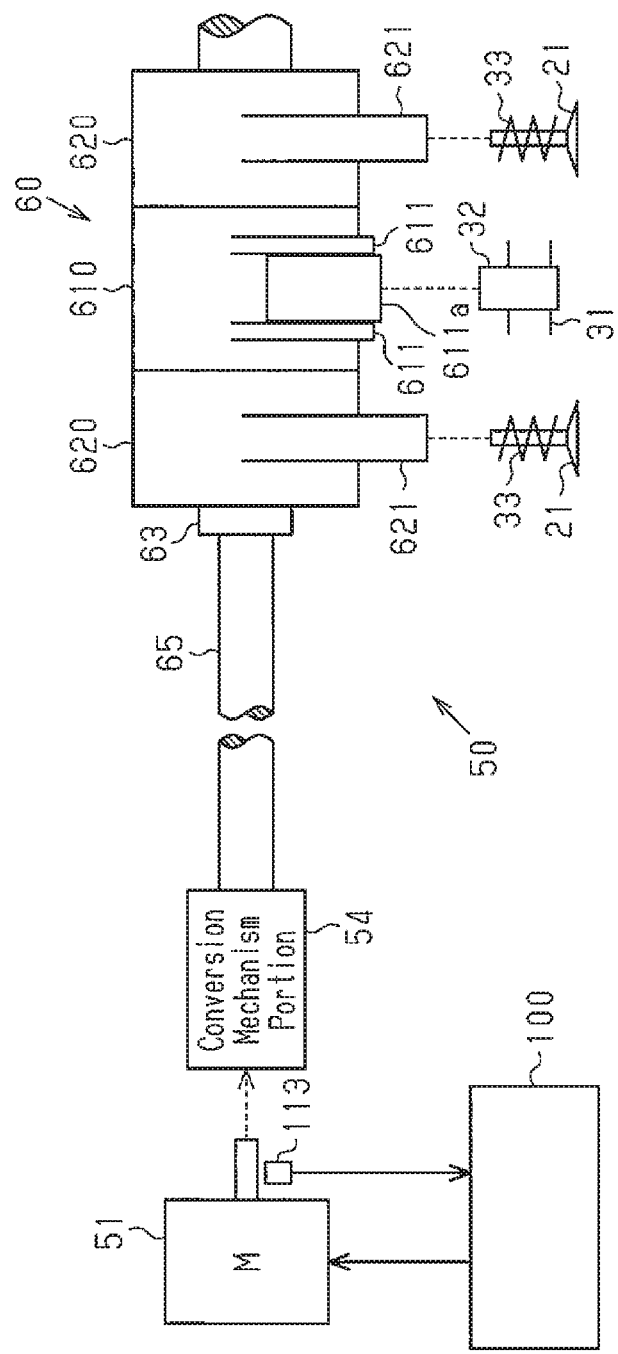
FIG. 5 is a diagram schematically showing the variable valve lift mechanism of FIG. 3 and a second motor, which drives the mechanism.

As shown in FIG. 5, the variable valve lift mechanism 50 has a conversion mechanism portion 54, which converts rotation of the output shaft of the second motor 51 into linear motion. When the drive torque from the second motor 51 is transmitted to the control shaft 65 via the conversion mechanism portion 54, the control shaft 65 is moved in a direction that corresponds to the rotation direction of the output shaft of the second motor 51. That is, the position of the control shaft 65 in the axial direction is adjusted by controlling the rotation angle of the output shaft of the second motor 51. That is, the maximum valve lift VL and the opening duration of the intake valves 21 are adjusted. Thus, the maximum valve lift VL of the intake valves 21 can be estimated by obtaining the rotation angle of the output shaft of the second motor 51.

The valve springs 33 for the intake valves 21 urge the intake valves 21 in the closing direction. Such urging force acts as cam torque CT on the cam 32 via the variable valve lift mechanism 50. The direction and the magnitude of the cam torque CT acting on the cam 32 vary in accordance with the rotation angle of the cam 32.

That is, when the lift of the intake valves 21 is being increased toward the maximum valve lift VL by rotation of the cam 32, the cam torque CT acts in a direction against the rotation of the cam 32. The period in which the cam torque CT acts in the direction against rotation of the cam 32 will be referred to as "a first period TA." When the lift of the intake valves 21 are reduced after the lift reaches the maximum valve lift VL, the cam torque CT acts in a direction assisting rotation of the cam 32. The period in which the cam torque CT assists rotation of the cam 32 will be referred to as "a second period TB."

Figure 6:
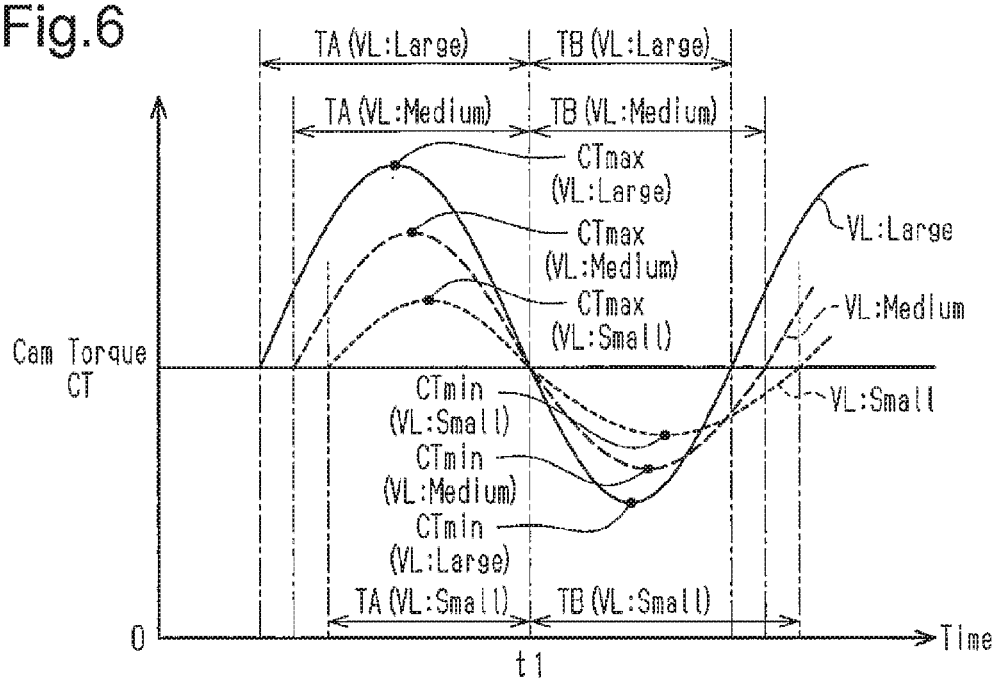
FIG. 6 is a graph showing the relationship between the maximum valve lift of the intake valves and the manner in which the cam torque changes.

Changes in the cam torque CT when the cam 32 is rotating are expressed as shown in FIG. 6, for example. That is, in the first period TA, the cam torque CT gradually increases. Then, after reaching the maximum value CTmax, the cam torque CT gradually decreases. At point in time t1, at which the lift of the intake valves 21 reaches the maximum valve lift VL, the first period TA shifts to the second period TB. In the second period TB, the cam torque CT gradually decreases. Then, after reaching the minimum value CTmin, the cam torque CT gradually increases.

Figure 14:
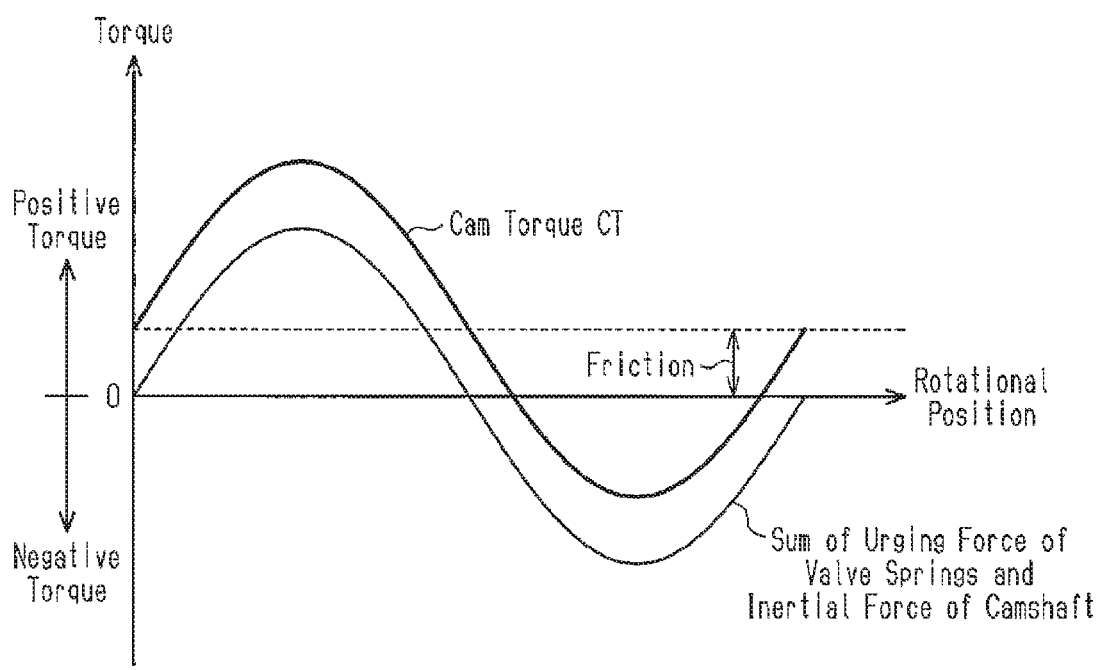
FIG. 14 is a graph schematically illustrating the relationship between the rotational position of a cam and cam torque.

FIG. 14 shows the relationship between the cam torque CT and the rotational position of the cam 32. In the graph, "positive torque" represents the cam torque CT acting in the direction against rotation of the cam 32, and "negative torque" represents the cam torque CT assisting rotation of the cam 32. Therefore, the period in which the positive torque acts on the cam 32 is the first period TA, and the period in which the negative torque acts on the cam 32 is the second period TB. Since the cam torque CT is a value obtained by adding friction to the sum of the urging force of the valve springs 33 and the inertial force of the camshaft 31, the first period TA is longer than the second period TB by an amount corresponding to the magnitude of the friction. Thus, it can be said that the cam torque CT is likely to act in the direction against rotation of the cam 32 and the camshaft 31, which rotate to selectively open and close the intake valves 21.

Therefore, in the present embodiment, the first period TA is longer than the second period TB by an amount corresponding to the magnitude of the friction as shown in FIG. 6. That is, the time during which the cam torque CT acts against rotation of the cam 32 is longer than the time during which the cam torque CT assists rotation of the cam 32. Accordingly, it can be said that rotation of the cam 32 is likely to be hampered by the cam torque CT.

As described above, the variable valve lift mechanism 50 is provided between the cam 32 and the intake valves 21, and the variable valve lift mechanism 50 is capable of adjusting the maximum valve lift VL of the intake valves 21. The greater the maximum valve lift VL, the more likely the cam torque CT is to increase. That is, as shown in FIG. 6, the greater the maximum valve lift VL of the intake valves 21, the greater the maximum value CTmax of the cam torque becomes. Thus, the more likely the cam torque CT is to be increased, the more likely rotation of the cam 32, which is rotating to open the intake valves 21, is to be hampered by the cam torque CT.

When the valve timing adjuster 40 is driven to change the relative rotational phase, influence of the process for changing the cam torque CT with the maximum valve lift VL of the intake valves 21 emerges. That is, when the relative rotational phase is retarded, the more likely the cam torque CT is to be increased, the more likely the deceleration of the camshaft 31 relative to the crankshaft 14 is to be assisted by the cam torque CT. Therefore, when the drive torque from the first motor 41 of the valve timing adjuster 40 has a constant value, that is, when the current value Iv at the first motor 41 has a constant value, the more likely the cam torque CT is to be increased, the more likely the retarding rate of the relative rotational phase is to be increased. When the relative rotational phase is retarded at a constant rate, the margin of reduction (that is, the fluctuation range) of the current value Iv immediately before the relative rotational phase starts being retarded resists increasing.

When the relative rotational phase is advanced, the more likely the cam torque CT is to be increased, the more likely the acceleration of the camshaft 31 relative to the crankshaft 14 is to be hindered by the cam torque CT. Therefore, when the drive torque from the first motor 41 of the valve timing adjuster 40 has a constant value, that is, when the drive signal duty cycle is constant and the current value Iv at the first motor 41 has a constant value, the more likely the cam torque CT is to be increased, the more likely the advancing rate of the relative rotational phase is to be decreased. When the relative rotational phase is advanced at a constant rate, the margin of increase (that is, the fluctuation range) of the current value Iv immediately before the relative rotational phase starts being advanced is likely to be increased.

The ECU 100 controls the drive signal duty cycle in a control mode selected from a plurality of control modes to change the relative rotational phase.

Figure 7:
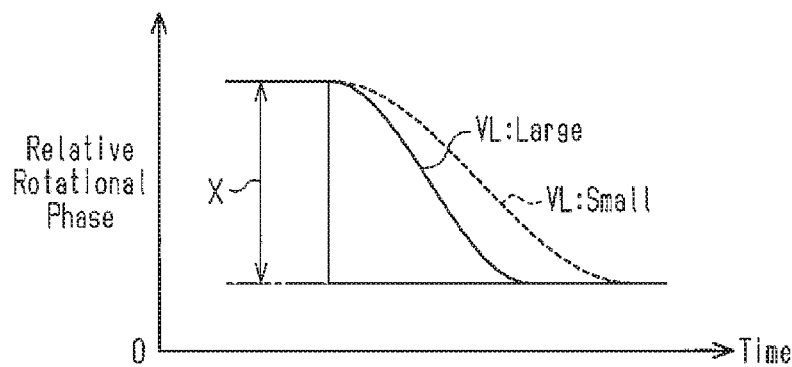
FIG. 7 is a time chart of the rotational phase of the camshaft relative to the crankshaft (hereinafter, referred to as relative rotational phase), showing changes in the relative rotational phase when, through execution of a first control mode, the relative rotational phase is retarded.

With reference to FIG. 7, the rate at which the relative rotational phase is retarded, or the phase retarding rate, through execution of the first control mode, in which the drive signal duty cycle is set to zero, will be described. When the relative rotational phase is retarded through execution of the first control mode, the current value Iv at the first motor 41 becomes substantially zero. Thus, the drive torque from the first motor 41 when the relative rotational phase is being retarded has a substantially constant value, which is substantially zero. In this case, as shown in FIG. 7, when the maximum valve lift VL of the intake valves 21 is large, the cam torque CT is more likely to be increased and the phase retarding rate of the relative rotational phase is greater than when the maximum valve lift VL of the intake valves 21 is small. Therefore, when the relative rotational phase is retarded through execution of the first control mode, the maximum valve lift VL of the intake valves 21 can be estimated based on the phase retarding rate of the relative rotational phase.

Figure 8:
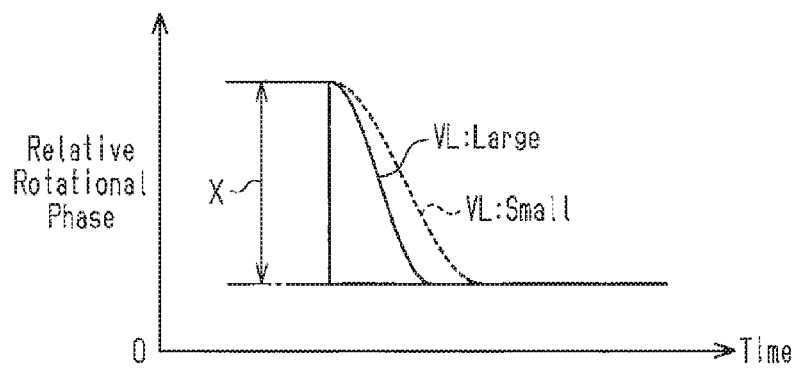
FIG. 8 is a time chart showing changes in the relative rotational phase when, through execution of a third control mode, the relative rotational phase is retarded.

Next, with reference to FIG. 8, the phase retarding rate of the relative rotational phase through execution of a third control mode, in which the duty cycle is set to the duty cycle for the lower limit value when rapidly retarding the relative rotational phase, will be described. For example, the current lower limit value LimIvA is a value obtained by multiplying the current upper limit value LimIv by −1. When the relative rotational phase is being rapidly retarded through execution of the third control mode, the current value Iv at the first motor 41 becomes the current lower limit value LimIvA, and the drive torque from the first motor 41 is substantially constant. In this case, as shown in FIG. 8, when the maximum valve lift VL of the intake valves 21 is large, the cam torque CT is more likely to be increased and the phase retarding rate of the relative rotational phase is greater than when the maximum valve lift VL of the intake valves 21 is small. Therefore, when the relative rotational phase is rapidly retarded through execution of the third control mode, the maximum valve lift VL of the intake valves 21 can be estimated based on the phase retarding rate of the relative rotational phase.

When the third control mode is executed, the drive torque from the first motor 41 is greater than that when the first control mode is executed, and the phase retarding rate of the relative rotational phase is increased correspondingly. Thus, when the relative rotational phase is rapidly changed to the most retarded phase, the third control mode is selected instead of the first control mode.

Figure 9:
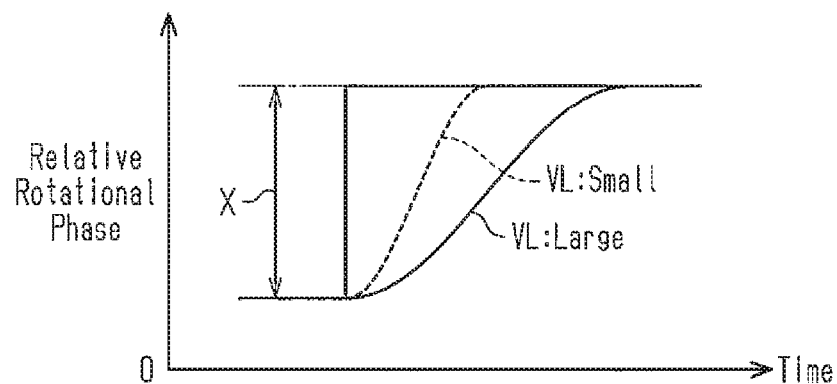
FIG. 9 is a time chart showing changes in the relative rotational phase when, through execution of a second control mode, the relative rotational phase is advanced.

With reference to FIG. 9, the phase advancing rate, at which the relative rotational phase is advanced, will be described. Specifically, FIG. 9 shows the phase advancing rate when the relative rotational phase is advanced through execution of a second control mode, in which the drive signal duty cycle is set to a duty ratio for the upper limit. When the relative rotational phase is advanced through execution of the second control mode, the current value Iv at the first motor 41 is the current upper limit value LimIv. Thus, the drive torque from the first motor 41 is substantially constant when the relative rotational phase is being advanced. In this case, as shown in FIG. 9, when the maximum valve lift VL of the intake valves 21 is large, the cam torque CT is more likely to be increased and the phase advancing rate of the relative rotational phase is smaller than when the maximum valve lift VL of the intake valves 21 is small. Therefore, when the relative rotational phase is advanced through execution of the second control mode, the maximum valve lift VL of the intake valves 21 can be estimated based on the phase advancing rate of the relative rotational phase.

However, when the rotation speed of the crankshaft 14 is significantly high, the cam torque CT is great, accordingly. Thus, the drive torque from the first motor 41 may not exceed the cam torque CT. In such a case, the relative rotational phase can be retarded by setting the current value Iv at the first motor 41 to the current upper limit value LimIv through execution of the second control mode. The region of the rotation speed of the crankshaft 14 in which the torque from the first motor 41 may fail to exceed the cam torque CT will be referred to as a "significantly high speed region." Immediately after the rotation speed of the crankshaft 14 has entered the significantly high speed region, retardation of the relative rotational phase can be controlled through execution of the second control mode. In this case, the drive torque from the first motor 41 when the relative rotational phase is being retarded is substantially constant. Thus, the more likely the cam torque CT is to be increased because of a great value of the maximum valve lift VL of the intake valves 21, the greater the phase retarding rate of the relative rotational phase becomes. Therefore, when the relative rotational phase is retarded through execution of the second control mode, the maximum valve lift VL of the intake valves 21 can be estimated based on the phase retarding rate of the relative rotational phase.

Figure 10:
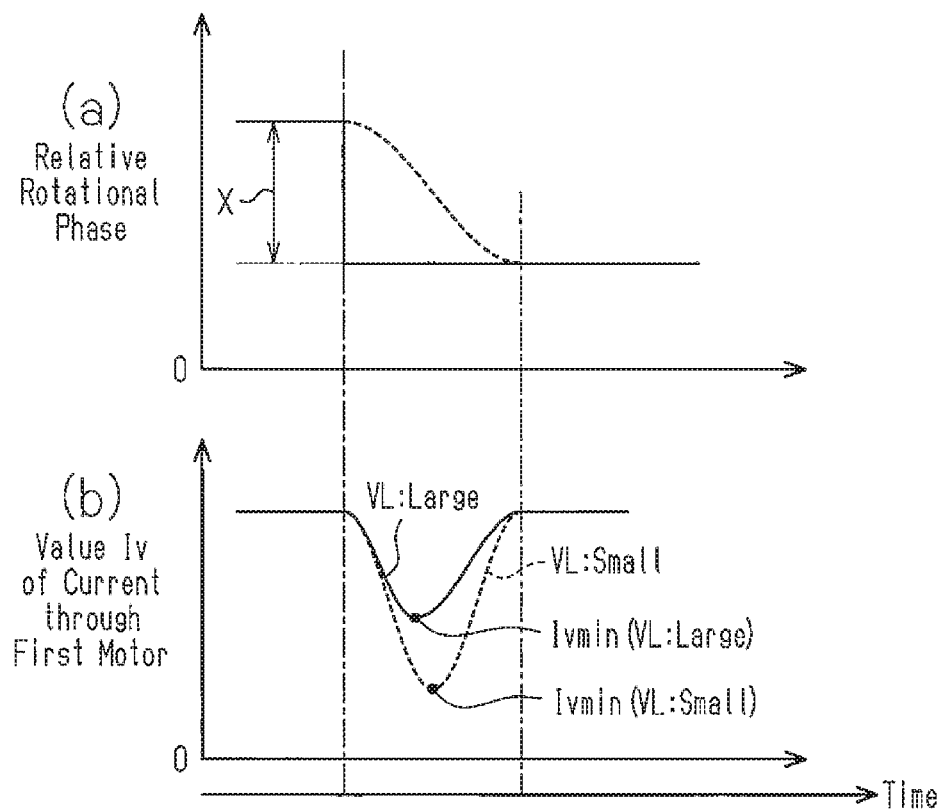
FIG. 10 is a time chart showing a case in which the relative rotational phase is retarded through execution of a fourth control mode, where section (a) shows changes in the relative rotational phase and section (b) shows changes in the value of a current through the first motor of the valve timing adjuster.

Next, with reference to FIG. 10, how the current value Iv changes at the first motor 41 will be described. Specifically, FIG. 10 illustrates a case in which the relative rotational phase is retarded through execution of a fourth control mode, which is different from the first control mode, the second control mode, and the third control mode. In the fourth control mode, the drive signal duty cycle is adjusted such that the current value Iv at the first motor 41 is varied within the range greater than zero and no greater than the current upper limit value LimIv to control the drive torque from the first motor 41. That is, when the drive signal duty cycle is controlled in the fourth control mode, the current value Iv at the first motor 41 is varied in a range greater than zero. Thus, the fourth control mode corresponds to one example of a "control mode for a positive current."

As indicated by the broken line in section (a) of FIG. 10, if the phase retarding rate of the relative rotational phase is constant when the relative rotational phase is retarded, the torque from the first motor 41 is adjusted in accordance with the maximum valve lift VL of the intake valves 21 at the time. That is, the more likely the cam torque CT is to be increased, the more quickly the relative rotational phase is retarded without significantly lowering the drive torque from the first motor 41. Thus, as shown in section (b) of FIG. 10, when the maximum valve lift VL of the intake valves 21 is large, the cam torque CT is more likely to be increased and the margin of reduction in the current value Iv from the value immediately before the relative rotational phase starts being retarded is smaller than when the maximum valve lift VL of the intake valves 21 is small. That is, when the relative rotational phase is retarded, a minimum value Ivmin of the current value at the first motor 41 is greater when the maximum valve lift VL of the intake valves 21 is large than when the maximum valve lift VL of the intake valves 21 is small. Therefore, when the relative rotational phase is retarded through execution of the fourth control mode, the maximum valve lift VL of the intake valves 21 can be estimated based on the minimum value Ivmin of the current value.

Figure 11:
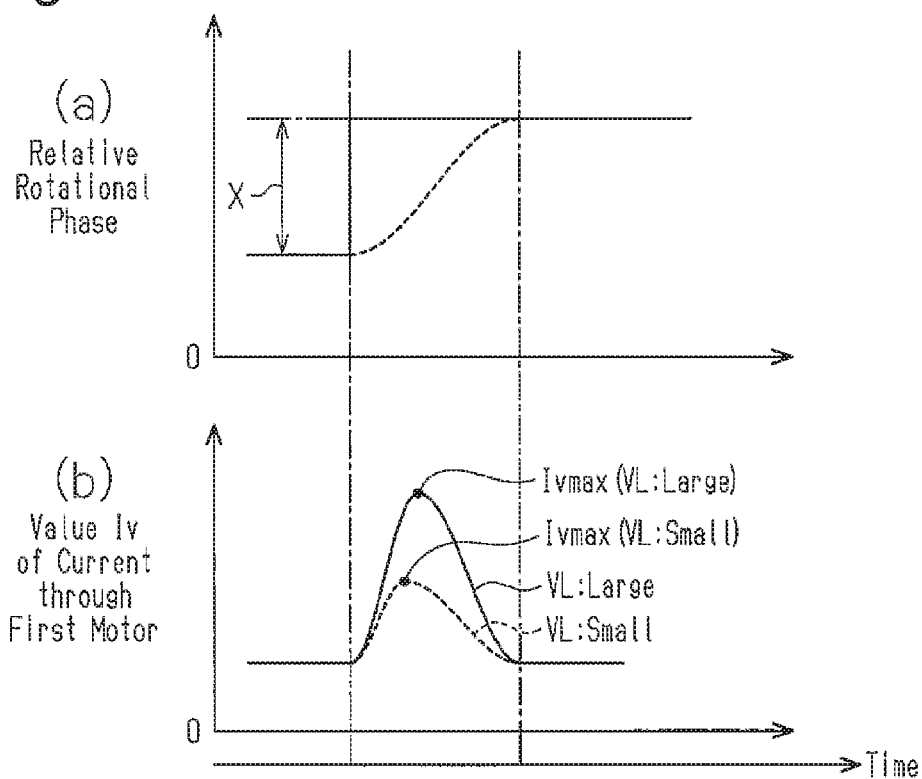
FIG. 11 is a time chart showing a case in which the relative rotational phase is advanced through execution of the fourth control mode, where section (a) shows changes in the relative rotational phase and section (b) shows changes in the value of the current through the first motor of the valve timing adjuster.

Next, with reference to FIG. 11, how the current value Iv at the first motor 41 is changed will be described. Specifically, FIG. 11 illustrates a case in which the relative rotational phase is advanced. As indicated by the broken line in section (a) of FIG. 11, if the phase advancing rate of the relative rotational phase is constant when the relative rotational phase is advanced, the torque from the first motor 41 is adjusted in accordance with the maximum valve lift VL at the time. That is, the more likely the cam torque CT is to be increased, the more greatly the drive toque of the first motor 41 needs to be increased to quickly advance the relative rotational phase. Thus, as shown in section (b) of FIG. 11, when the maximum valve lift VL of the intake valves 21 is large, the cam torque CT is more likely to be increased and the margin of increase in the current value Iv at the first motor 41 from the value immediately before the relative rotational phase starts being advanced is larger than when the maximum valve lift VL of the intake valves 21 is small. That is, when the relative rotational phase is advanced, a maximum value Ivmax of the current value at the first motor 41 is greater when the maximum valve lift VL of the intake valves 21 is large than when the maximum valve lift VL of the intake valves 21 is small. Therefore, when the relative rotational phase is advanced through execution of the fourth control mode, the maximum valve lift VL of the intake valves 21 can be estimated based on the maximum value Ivmax of the current value.

Figure 12:
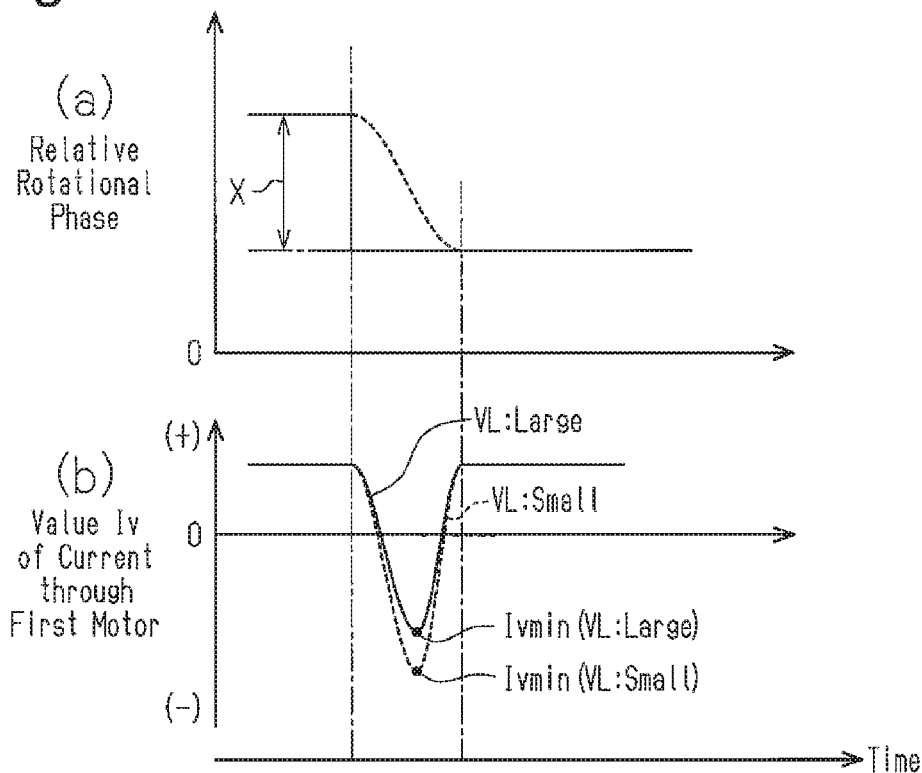
FIG. 12 is a time chart showing a case in which the relative rotational phase is retarded through execution of a fifth control mode, where section (a) shows changes in the relative rotational phase and section (b) shows changes in the value of a current through the first motor of the valve timing adjuster.

Next, with reference to FIG. 12, how the current value Iv changes at the first motor 41 will be described. Specifically, FIG. 12 illustrates a case in which the relative rotational phase is rapidly retarded through execution of a fifth control mode, which is different from the first control mode, the second control mode, and the third control mode. In the fifth control mode, the drive signal duty cycle is adjusted such that the current value Iv at the first motor 41 is varied within a range less than zero and no less than the current lower limit value LimIvA to control the drive torque from the first motor 41. That is, when the drive signal duty cycle is controlled in the fifth control mode, the current value Iv at the first motor 41 is varied in a range less than zero. Thus, the fifth control mode corresponds to one example of a "control mode for a negative current."

As indicated by the broken line in section (a) of FIG. 12, if the phase retarding rate of the relative rotational phase is constant when the relative rotational phase is rapidly retarded, the torque from the first motor 41 is adjusted in accordance with the maximum valve lift VL of the intake valves 21 at the time. That is, the more likely the cam torque CT is to be increased, the more quickly the relative rotational phase is retarded without significantly lowering the drive torque from the first motor 41. Thus, as shown in section (b) of FIG. 12, when the maximum valve lift VL of the intake valves 21 is large, the cam torque CT is more likely to be increased and the margin of decrease in the current value Iv at the first motor 41 from the value immediately before the relative rotational phase starts being retarded is smaller than when the maximum valve lift VL of the intake valves 21 is small. That is, when the relative rotational phase is rapidly retarded, the minimum value Ivmin of the current value at the first motor 41 is greater when the maximum valve lift VL of the intake valves 21 is large than when the maximum valve lift VL of the intake valves 21 is small. Therefore, when the relative rotational phase is rapidly retarded through execution of the fifth control mode, the maximum valve lift VL of the intake valves 21 can be estimated based on the minimum value Ivmin of the current value.

When the relative rotational phase is retarded through execution of the fifth control mode, the change of the relative rotational phase is assisted by the drive torque from the first motor 41. Accordingly, the phase retarding rate is increased compared to a case in which the relative rotational phase is retarded through execution of the fourth control mode. Thus, to rapidly retard the relative rotational phase, the fifth control mode is selected instead of the fourth control mode.

When retarding the relative rotational phase by executing the first control mode, that is, by setting the drive signal duty cycle to zero, the ECU 100 of the present embodiment calculates the phase retarding rate of the relative rotational phase as a rate of change VA to perform abnormality diagnosis for the variable valve lift mechanism 50. For example, the maximum value of the phase retarding rate of the relative rotational phase when the relative rotational phase is being retarded is calculated as the rate of change VA. Also, the rotation angle of the output shaft of the second motor 51 and the rotation speed of the crankshaft 14 immediately before the relative rotational phase starts being retarded are obtained, and a reference rate-of-change value VATh that corresponds to the obtained rotation angle and rotation speed is calculated. Since the rotation angle of the output shaft of the second motor 51 is correlated with the maximum valve lift VL of the intake valves 21, it can be said that the reference rate-of-change value VATh is set to a value that corresponds to the maximum valve lift. The rate of change VA of the relative rotational phase is compared with the reference rate-of-change value VATh. When the rate of change VA is substantially equal to the reference rate-of-change value VATh, the variable valve lift mechanism 50 is determined to be normal. When the rate of change VA of the relative rotational phase is displaced from the reference rate-of-change value VATh, the variable valve lift mechanism 50 is determined to be abnormal.

When the relative rotational phase is retarded through execution of the first control mode, the reference rate-of-change value VATh is calculated by referring to a map for the first control mode. The map (not shown) is configured based on the relationship between the rotation angle of the output shaft of the second motor 51 and the rotation speed of the crankshaft 14. For example, when the rotation direction of the output shaft of the second motor 51 is the positive direction to increase the maximum valve lift VL of the intake valves 21, the greater the rotation angle in the positive direction of the output shaft of the second motor 51 detected by the motor sensor 113, that is, the greater the predicted maximum valve lift VL of the intake valves 21, the more likely the cam torque CT is to be increased. Accordingly, the phase retarding rate of the relative rotational phase is likely to be increased. Thus, if the rotation speed of the crankshaft 14 is the same, the greater the rotation angle in the forward direction of the output shaft of the second motor 51, which is detected by the motor sensor 113, the greater the reference rate-of-change value VATh is set to be.

Except when the rotation speed of the crankshaft 14 is low, the greater the rotation speed of the crankshaft 14, the more likely the cam torque CT is to be increased. In contrast, when the rotation speed of the crankshaft 14 is low, the lower the rotation speed of the crankshaft 14, the more likely the cam torque CT is to be increased. Thus, if the rotation angle of the output shaft of the second motor 51, which is detected by the motor sensor 113, is the same, the reference rate-of-change value VATh is set to be greater when the rotation speed of the crankshaft 14 has a value that increases the cam torque CT than when such is not the case.

When rapidly retarding the relative rotational phase by executing the third control mode, that is, by setting the drive signal duty cycle to the duty cycle for the lower limit value, the ECU 100 of the present embodiment calculates the phase retarding rate of the relative rotational phase as the rate of change VA to perform abnormality diagnosis for the variable valve lift mechanism 50. For example, the maximum value of the phase retarding rate of the relative rotational phase when the relative rotational phase is being retarded is calculated as the rate of change VA. Also, the rotation angle of the output shaft of the second motor 51 and the rotation speed of the crankshaft 14 immediately before the relative rotational phase starts being retarded are obtained, and a reference rate-of-change value VATh that corresponds to the obtained rotation angle and rotation speed is calculated. The rate of change VA of the relative rotational phase is compared with the reference rate-of-change value VATh. When the rate of change VA is substantially equal to the reference rate-of-change value VATh, the variable valve lift mechanism 50 is determined to be normal. When the rate of change VA of the relative rotational phase is displaced from the reference rate-of-change value VATh, the variable valve lift mechanism 50 is determined to be abnormal.

When the relative rotational phase is rapidly retarded through execution of the third control mode, the reference rate-of-change value VATh is calculated by referring to a map for the third control mode. The map (not shown) is configured based on the relationship between the rotation angle of the output shaft of the second motor 51 and the rotation speed of the crankshaft 14. That is, as described above, the greater the rotation angle in the forward direction of the output shaft of the second motor 51, which is detected by the motor sensor 113, that is, the greater the predicted maximum valve lift VL of the intake valves 21, the more likely the cam torque CT is to be increased. Accordingly, the phase retarding rate of the relative rotational phase is likely to be increased. Thus, if the rotation speed of the crankshaft 14 is the same, the greater the rotation angle in the forward direction of the output shaft of the second motor 51, which is detected by the motor sensor 113, the greater the reference rate-of-change value VATh is set to be.

Except when the rotation speed of the crankshaft 14 is low, the greater the rotation speed of the crankshaft 14, the more likely the cam torque CT is to be increased. In contrast, when the rotation speed of the crankshaft 14 is low, the lower the rotation speed of the crankshaft 14, the more likely the cam torque CT is to be increased. Thus, if the rotation angle of the output shaft of the second motor 51, which is detected by the motor sensor 113, is the same, the reference rate-of-change value VATh is set to be greater when the rotation speed of the crankshaft 14 has a value that increases the cam torque CT than when such is not the case.

When advancing the relative rotational phase by executing the second control mode, that is, by setting the drive signal duty cycle to the duty cycle for the upper limit value, the ECU 100 of the present embodiment calculates the phase advancing rate of the relative rotational phase as the rate of change VA to perform abnormality diagnosis for the variable valve lift mechanism 50. For example, the maximum value of the phase advancing rate of the relative rotational phase when the relative rotational phase is being advanced is calculated as the rate of change VA. The rotation angle of the output shaft of the second motor 51 and the rotation speed of the crankshaft 14 immediately before the relative rotational phase starts being advanced are obtained, and a reference rate-of-change value VATh that corresponds to the obtained rotation angle and rotation speed is calculated. The rate of change VA of the relative rotational phase is compared with the reference rate-of-change value VATh. When the rate of change VA is substantially equal to the reference rate-of-change value VATh, the variable valve lift mechanism 50 is determined to be normal. When the rate of change VA of the relative rotational phase is displaced from the reference rate-of-change value VATh, the variable valve lift mechanism 50 is determined to be abnormal.

When the relative rotational phase is advanced through execution of the second control mode, the reference rate-of-change value VATh is calculated by referring to a phase advancing map for the second control mode. The map (not shown) is configured based on the relationship between the rotation angle of the output shaft of the second motor 51 and the rotation speed of the crankshaft 14. That is, as described above, the greater the rotation angle in the forward direction of the output shaft of the second motor 51, which is detected by the motor sensor 113, that is, the greater the predicted maximum valve lift VL of the intake valves 21, the more likely the cam torque CT is to be increased. Accordingly, the phase advancing rate of the relative rotational phase is likely to be decreased. Thus, if the rotation speed of the crankshaft 14 is the same, the greater the rotation angle in the forward direction of the output shaft of the second motor 51, which is detected by the motor sensor 113, the smaller the reference rate-of-change value VATh is set to be.

As described above, except when the rotation speed of the crankshaft 14 is low, the greater the rotation speed of the crankshaft 14, the more likely the cam torque CT is to be increased. In contrast, when the rotation speed of the crankshaft 14 is low, the lower the rotation speed of the crankshaft 14, the more likely the cam torque CT is to be increased. Thus, if the rotation angle of the output shaft of the second motor 51, which is detected by the motor sensor 113, is the same, the reference rate-of-change value VATh is set to be smaller when the rotation speed of the crankshaft 14 has a value that increases the cam torque CT than when such is not the case.

When retarding the relative rotational phase through execution of the second control mode, the ECU 100 of the present embodiment calculates the phase retarding rate of the relative rotational phase as the rate of change VA to perform abnormality diagnosis for the variable valve lift mechanism 50. For example, the maximum value of the phase retarding rate of the relative rotational phase when the relative rotational phase is being retarded is calculated as the rate of change VA. The rotation angle of the output shaft of the second motor 51 and the rotation speed of the crankshaft 14 immediately before the relative rotational phase starts being retarded are obtained, and the reference rate-of-change value VATh that corresponds to the obtained rotation angle and rotation speed is calculated. The rate of change VA of the relative rotational phase is compared with the reference rate-of-change value VATh. When the rate of change VA is substantially equal to the reference rate-of-change value VATh, the variable valve lift mechanism 50 is determined to be normal. When the rate of change VA of the relative rotational phase is displaced from the reference rate-of-change value VATh, the variable valve lift mechanism 50 is determined to be abnormal.

When the relative rotational phase is retarded through execution of the second control mode, the reference rate-of-change value VATh is calculated by referring to a phase retarding map for the second control mode. The map (not shown) is configured based on the relationship between the rotation angle of the output shaft of the second motor 51 and the rotation speed of the crankshaft 14. That is, as described above, the greater the rotation angle in the forward direction of the output shaft of the second motor 51, which is detected by the motor sensor 113, that is, the greater the predicted maximum valve lift VL of the intake valves 21, the more likely the cam torque CT is to be increased. Accordingly, the phase retarding rate of the relative rotational phase is likely to be increased. Thus, if the rotation speed of the crankshaft 14 is the same, the greater the rotation angle in the forward direction of the output shaft of the second motor 51, which is detected by the motor sensor 113, the greater the reference rate-of-change value VATh is set to be.

When the rotation speed of the crankshaft 14 is in the significantly high speed region, the higher the rotation speed of the crankshaft 14, the more likely the cam torque CT is to be increased. Thus, if the rotation angle of the output shaft of the second motor 51 is the same, the higher the rotation speed of the crankshaft 14, the greater the reference rate-of-change value VATh is set to be.

When retarding the relative rotational phase through execution of the fourth control mode, the ECU 100 of the present embodiment detects the minimum value Ivmin of the current value of the first motor 41 when the relative rotational phase is being retarded to perform abnormality diagnosis for the variable valve lift mechanism 50. Then, a reference current value IvTh is calculated that corresponds to the rotation angle of the output shaft of the second motor 51, the rotation speed of the crankshaft 14, and a target change amount X of the relative rotational phase immediately before the relative rotational phase starts being retarded. The minimum value Ivmin of the current value is compared with the reference current value IvTh. When the minimum value Ivmin of the current value is substantially equal to the reference current value IvTh, the variable valve lift mechanism 50 is determined to be normal. When the current minimum value Ivmin is displaced from the reference current value IvTh, the variable valve lift mechanism 50 is determined to be abnormal.

When the relative rotational phase is retarded through execution of the fourth control mode, the reference current value IvTh is calculated by referring to a phase retarding map for the fourth control mode. The phase retarding map (not shown) is configured based on the relationship between the rotation angle of the output shaft of the second motor 51, the target change amount X of the relative rotational phase, and the rotation speed of the crankshaft 14. That is, as described above, the greater the rotation angle in the forward direction of the output shaft of the second motor 51, which is detected by the motor sensor 113, that is, the greater the predicted maximum valve lift VL of the intake valves 21, the more likely the cam torque CT is to be increased. Accordingly, the minimum value Ivmin of the current value is less likely to be decreased. Thus, if the target change amount X of the relative rotational phase is the same and the rotation speed of the crankshaft 14 is the same, the greater the rotation angle in the forward direction of the output shaft of the second motor 51, which is detected by the motor sensor 113, the greater the reference current value IvTh is set to be.

The greater the target change amount X of the relative rotational phase, the more likely the time required for changing the relative rotational phase is to be extended and the more likely the margin of change of the current value Iv immediately before the relative rotational phase starts being retarded is to be increased. That is, the greater the target change amount X of the relative rotational phase, the more likely the minimum value Ivmin of the current value is to be reduced. Thus, if the rotation angle of the output shaft of the second motor 51 is the same and the rotation speed of the crankshaft 14 is the same, the greater the predicted value of the target change amount X of the relative rotational phase, the lower the reference current value IvTh is set to be.

Further, as described above, except when the rotation speed of the crankshaft 14 is low, the greater the rotation speed of the crankshaft 14, the more likely the cam torque CT is to be increased. In contrast, when the rotation speed of the crankshaft 14 is low, the lower the rotation speed of the crankshaft 14, the more likely the cam torque CT is to be increased. Also, the more likely the cam torque CT is to be increased, the less likely the minimum value Ivmin of the current value is to be reduced. Thus, if the rotation angle of the output shaft of the second motor 51 is the same and the target change amount X of the relative rotational phase is the same, the reference rate-of-change value VATh is set to be greater when the rotation speed of the crankshaft 14 has a value that increases the cam torque CT than when such is not the case.

When advancing the relative rotational phase through execution of the fourth control mode, the ECU 100 of the present embodiment detects the maximum value Ivmax of the current value through the first motor 41 when the relative rotational phase is being advanced to perform abnormality diagnosis for the variable valve lift mechanism 50. Then, a reference current value IvTh is calculated that corresponds to the rotation angle of the output shaft of the second motor 51, the rotation speed of the crankshaft 14, and a target change amount X of the relative rotational phase immediately before the relative rotational phase starts being advanced. The maximum value Ivmax of the current value is compared with the reference current value IvTh. When the maximum value Ivmax of the current value is substantially equal to the reference current value IvTh, the variable valve lift mechanism 50 is determined to be normal. When the current maximum value Ivmax is displaced from the reference current value IvTh, the variable valve lift mechanism 50 is determined to be abnormal.

When the relative rotational phase is advanced through execution of the fourth control mode, the reference current value IvTh is calculated by referring to a phase advancing map for the fourth control mode. The phase advancing map (not shown) is configured based on the relationship between the rotation angle of the output shaft of the second motor 51, the target change amount X of the relative rotational phase, and the rotation speed of the crankshaft 14. That is, as described above, the greater the rotation angle in the forward direction of the output shaft of the second motor 51, which is detected by the motor sensor 113, that is, the greater the predicted maximum valve lift VL of the intake valves 21, the more likely the cam torque CT is to be increased. Accordingly, the maximum value Ivmax of the current value is likely to be increased. Thus, if the target change amount X of the relative rotational phase is the same and the rotation speed of the crankshaft 14 is the same, the greater the rotation angle in the forward direction of the output shaft of the second motor 51, which is detected by the motor sensor 113, the greater the reference current value IvTh is set to be.

As described above, the greater the target change amount X of the relative rotational phase, the more likely the time required for changing the relative rotational phase is to be extended and the more likely the margin of change of the current value Iv with respect to the current value Iv immediately before the relative rotational phase starts being advanced is to be increased. That is, the greater the target change amount X of the relative rotational phase, the more likely the maximum value Ivmax of the current value is to be increased. Thus, if the rotation angle of the output shaft of the second motor 51 is the same and the rotation speed of the crankshaft 14 is the same, the greater the predicted value of the target change amount X of the relative rotational phase, the greater the reference current value IvTh is set to be.

Further, as described above, except when the rotation speed of the crankshaft 14 is low, the greater the rotation speed of the crankshaft 14, the more likely the cam torque CT is to be increased. In contrast, when the rotation speed of the crankshaft 14 is low, the lower the rotation speed of the crankshaft 14, the more likely the cam torque CT is to be increased. Also, the more likely the cam torque CT is to be increased, the more likely the maximum value Ivmax of the current value is to be increased. Thus, if the rotation angle of the output shaft of the second motor 51 is the same and the target change amount X of the relative rotational phase is the same, the reference current value IvTh is set to be greater when the rotation speed of the crankshaft 14 has a value that increases the cam torque CT than when such is not the case.

When rapidly retarding the relative rotational phase through execution of the fifth control mode, the ECU 100 of the present embodiment detects the minimum value Ivmin of the current value at the first motor 41 when the relative rotational phase is being retarded to perform abnormality diagnosis for the variable valve lift mechanism 50. Then, a reference current value IvTh is calculated that corresponds to the rotation angle of the output shaft of the second motor 51, the rotation speed of the crankshaft 14, and a target change amount X of the relative rotational phase immediately before the relative rotational phase starts being retarded. The minimum value Ivmin of the current value is compared with the reference current value IvTh. When the minimum value Ivmin of the current value is substantially equal to the reference current value IvTh, the variable valve lift mechanism 50 is determined to be normal. When the current minimum value Ivmin is displaced from the reference current value IvTh, the variable valve lift mechanism 50 is determined to be abnormal. The reference current value Ivth is a positive value.

When the relative rotational phase is rapidly retarded through execution of the fifth control mode, the reference current value IvTh is calculated by referring to a phase retarding map for the fifth control mode. The phase retarding map (not shown) is configured based on the relationship between the rotation angle of the output shaft of the second motor 51, the target change amount X of the relative rotational phase, and the rotation speed of the crankshaft 14. That is, as described above, the greater the rotation angle in the forward direction of the output shaft of the second motor 51, which is detected by the motor sensor 113, that is, the greater the predicted maximum valve lift VL of the intake valves 21, the more likely the cam torque CT is to be increased. Accordingly, the minimum value Ivmin of the current value is less likely to be decreased. Thus, if the target change amount X of the relative rotational phase is the same and the rotation speed of the crankshaft 14 is the same, the greater the rotation angle in the forward direction of the output shaft of the second motor 51, which is detected by the motor sensor 113, the greater the reference current value IvTh is set to be.

The greater the target change amount X of the relative rotational phase, the more likely the time required for changing the relative rotational phase is to be extended and the more likely the margin of change of the current value Iv with respect to the current value Iv immediately before the relative rotational phase starts being retarded is to be increased. That is, the greater the target change amount X of the relative rotational phase, the more likely the minimum value Ivmin of the current value is to be reduced. Thus, if the rotation angle of the output shaft of the second motor 51 is the same and the rotation speed of the crankshaft 14 is the same, the greater the predicted value of the target change amount X of the relative rotational phase, the lower the reference current value IvTh is set to be.

Further, as described above, except when the rotation speed of the crankshaft 14 is low, the greater the rotation speed of the crankshaft 14, the more likely the cam torque CT is to be increased. In contrast, when the rotation speed of the crankshaft 14 is low, the lower the rotation speed of the crankshaft 14, the more likely the cam torque CT is to be increased. Also, the more likely the cam torque CT is to be increased, the less likely the minimum value Ivmin of the current value is to be reduced. Thus, if the rotation angle of the output shaft of the second motor 51 is the same and the target change amount X of the relative rotational phase is the same, the reference current value IvTh is set to be greater when the rotation speed of the crankshaft 14 has a value that increases the cam torque CT than when such is not the case.

Next, with reference to the flowchart of FIG. 13, a process routine executed by the ECU 100 when performing the abnormality diagnosis for the variable valve lift mechanism 50 will be described. The process routine is executed immediately after change in the relative rotational phase has been completed.

Figure 13:
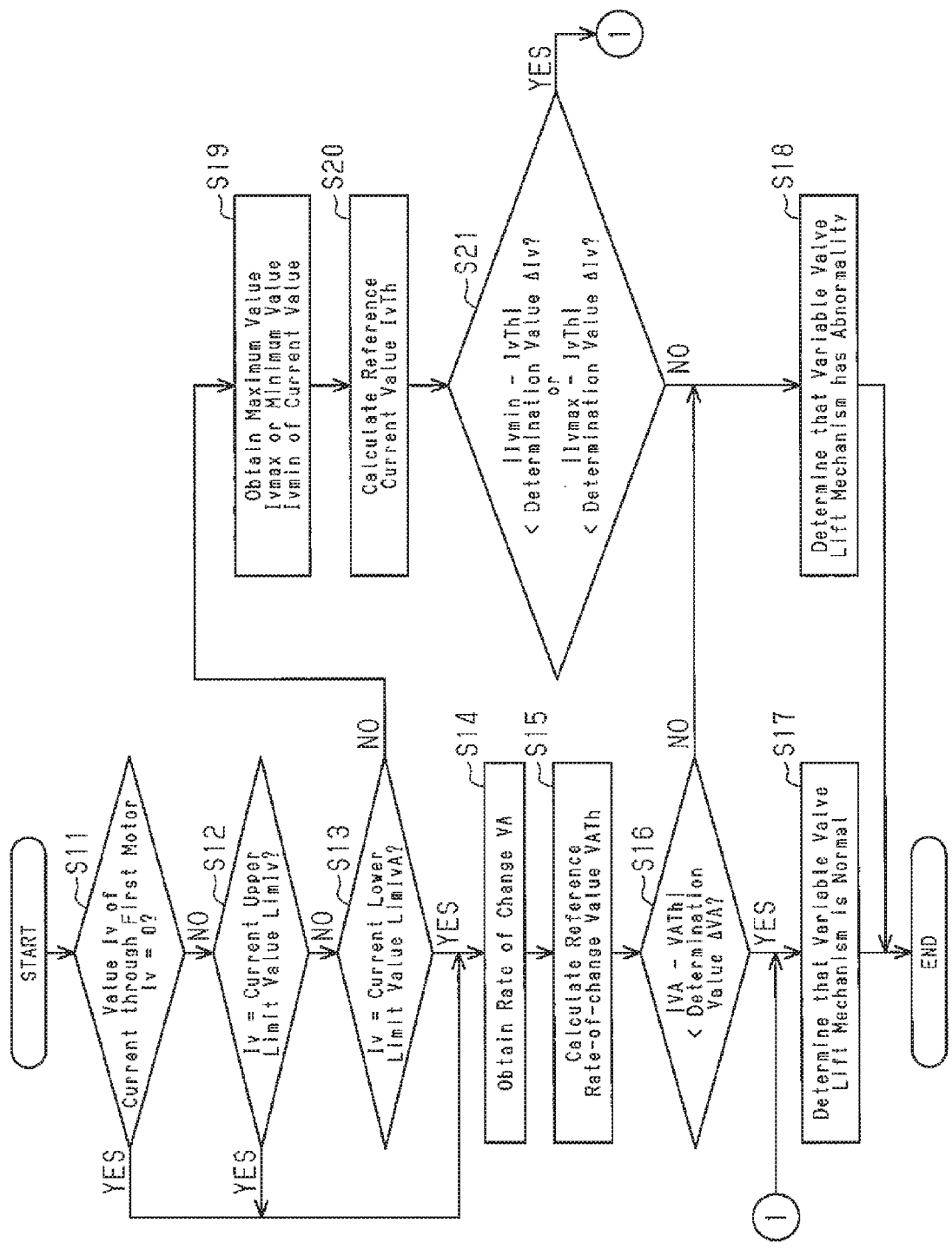
FIG. 13 is a flowchart illustrating a process routine that is executed by the controller when the controller performs abnormality diagnosis for the variable valve lift mechanism.

As shown in FIG. 13, in this process routine, the ECU 100 determines whether the current value Iv at the first motor 41 of the valve timing adjuster 40 is zero (step S11). That is, when the relative rotational phase is retarded through execution of the first control mode, the relative rotational phase becomes the most retarded phase and the current value Iv becomes zero. Thus, it can be said that step S11 determines, through execution of the first control mode, whether it is immediately after the relative rotational phase has been retarded. That is, at step S11, it may be determined whether the drive signal duty cycle is zero. When the current value Iv is zero (step S11: YES), the ECU 100 proceeds to step S14, which will be described below.

In contrast, when the current value Iv is not zero (step S11: NO), the ECU 100 determines whether the current value Iv at the first motor 41 is equal to the current upper limit value LimIv (step S12). That is, when the relative rotational phase is advanced through execution of the second control mode, the relative rotational phase becomes the most advanced phase and the current value Iv becomes the current upper limit value LimIv. When the relative rotational phase is retarded through execution of the second control mode, the relative rotational phase becomes the most retarded phase and the current value Iv becomes the current upper limit value LimIv. In contrast, when the relative rotational phase is changed through execution of the third control mode, the fourth control mode, or the fifth control mode, the current value Iv becomes less than the current upper limit value LimIv. Thus, it can be said that step S12 determines, through execution of the second control mode, whether it is immediately after the relative rotational phase has been changed. That is, at step S12, it may be determined whether the drive signal duty cycle is equal to the duty cycle for the upper limit value. When the current value Iv is the current upper limit value LimIv (step S12: YES), the ECU 100 proceeds to step S14, which will be described below.

In contrast, when the current value Iv is not the current upper limit value LimIv (step S12: NO), the ECU 100 determines whether the current value Iv through the first motor 41 is the current lower limit value LimIvA (step S13). When the relative rotational phase is retarded through execution of the third control mode, the relative rotational phase becomes the most retarded phase and the current value Iv becomes the current lower limit value LimIvA. In contrast, when the relative rotational phase is changed through execution of the fourth control mode or the fifth control mode, the current value Iv becomes greater than the current lower limit value LimIvA. Thus, it can be said that step S13 determines, through execution of the third control mode, whether it is immediately after the relative rotational phase has been retarded. That is, at step S13, it may be determined whether the drive signal duty cycle is equal to the duty cycle for the lower limit value. When the current value Iv is the current lower limit value LimIvA (step S13: YES), the ECU 100 proceeds to the next step, or step S14.

At step S14, the ECU 100 obtains the rate of change VA of the relative rotational phase that corresponds to the executed control mode. For example, when it is immediately after the relative rotational phase has been retarded through execution of the first control mode (step S11: YES), the maximum value of the phase retarding rate when the relative rotational phase is being changed is obtained as the rate of change VA of the relative rotational phase. Also, when it is immediately after the relative rotational phase has been advanced through execution of the second control mode (step S12: YES), the maximum value of the phase advancing rate when the relative rotational phase is being advanced is obtained as the rate of change VA of the relative rotational phase. Further, when it is immediately after the relative rotational phase has been retarded through execution of the second control mode (step S12: YES), the maximum value of the phase retarding rate when the relative rotational phase is being retarded is obtained as the rate of change VA of the relative rotational phase. When it is immediately after the relative rotational phase has been rapidly retarded through execution of the third control mode (step S13: YES), the maximum value of the phase retarding rate when the relative rotational phase is being retarded is obtained as the rate of change VA of the relative rotational phase.

Subsequently, the ECU 100 calculates the reference rate-of-change value VATh (step S15). Specifically, when it is immediately after the relative rotational phase has been retarded through execution of the first control mode (step S11: YES), the reference rate-of-change value VATh is calculated by referring to the map for the first control mode. That is, the reference rate-of-change value VATh is set to a value that corresponds to the rotation angle of the output shaft of the second motor 51 and the rotation speed of the crankshaft 14 immediately before the relative rotational phase starts being changed through execution of the first control mode.

When it is immediately after the relative rotational phase has been advanced through execution of the second control mode (step S12: YES), the reference rate-of-change value VATh is calculated by referring to the phase advancing map for the second control mode. That is, the reference rate-of-change value VATh is set to a value that corresponds to the rotation angle of the output shaft of the second motor 51 and the rotation speed of the crankshaft 14 immediately before the relative rotational phase starts being changed through execution of the second control mode. When it is immediately after the relative rotational phase has been retarded through execution of the second control mode (step S12: YES), the reference rate-of-change value VATh is calculated by referring to the phase retarding map for the second control mode. That is, the reference rate-of-change value VATh is set to a value that corresponds to the rotation angle of the output shaft of the second motor 51 and the rotation speed of the crankshaft 14 immediately before the relative rotational phase starts being changed through execution of the second control mode.

When it is immediately after the relative rotational phase has been rapidly retarded through execution of the third control mode (step S13: YES), the reference rate-of-change value VATh is calculated by referring to the map for the third control mode. That is, the reference rate-of-change value VATh is set to a value that corresponds to the rotation angle of the output shaft of the second motor 51 and the rotation speed of the crankshaft 14 immediately before the relative rotational phase starts being changed through execution of the third control mode.

At step S16, the ECU 100 determines whether the difference between the rate of change VA and the reference rate-of-change value VATh (|VA−VATh|), or the difference related to the rate of change VA, is less than a determination value ΔVA. When the difference related to the rate of change VA is less than the determination value ΔVA, it can be determined that the rate of change VA substantially agrees with the reference rate-of-change value VATh. When the difference related to the rate of change VA is greater than or equal to the determination value ΔVA, it can be determined that the rate of change VA is displaced from the reference rate-of-change value VATh.

Thus, when the difference related to the rate of change VA is less than determination value ΔVA (step S16: YES), the ECU 100 determines that the variable valve lift mechanism 50 is normal and ends the current process routine (step S17). In contrast, when the difference related to the rate of change VA is greater than or equal to determination value ΔVA (step S16: NO), the ECU 100 determines that the variable valve lift mechanism 50 has an abnormality and ends the current process routine (step S18).

At step S13, when the current value Iv is not the current lower limit value LimIvA (NO), the ECU 100 obtains the maximum value Ivmax or the minimum value Ivmin of the current value at the first motor 41 when the relative rotational phase was being changed (step S19). That is, when it is immediately after the relative rotational phase has been retarded through execution of the fourth control mode, the minimum value Ivmin of the current value is obtained. In contrast, when it is immediately after the relative rotational phase has been advanced through execution of the fourth control mode, the maximum value Ivmax of the current value is obtained. Further, when it is immediately after the relative rotational phase has been retarded through execution of the fifth control mode, the minimum value Ivmin of the current value is obtained.

Subsequently, the ECU 100 calculates the reference current value IvTh that corresponds to the executed control mode (step S20). Specifically, when it is immediately after the relative rotational phase has been retarded through execution of the fourth control mode, the reference current value IvTh is calculated by referring to the phase retarding map for the fourth control mode. That is, the reference current value IvTh is set to a value that corresponds to the rotation angle of the output shaft of the second motor 51, the rotation speed of the crankshaft 14, and the target change amount X of the relative rotational phase immediately before the relative rotational phase starts being retarded through execution of the fourth control mode. In contrast, when it is immediately after the relative rotational phase has been advanced through execution of the fourth control mode, the reference current value IvTh is calculated by referring to the phase advancing map for the fourth control mode. That is, the reference current value IvTh is set to a value that corresponds to the rotation angle of the output shaft of the second motor 51, the rotation speed of the crankshaft 14, and the target change amount X of the relative rotational phase immediately before the relative rotational phase starts being advanced through execution of the fourth control mode. Further, when it is immediately after the relative rotational phase has been retarded through execution of the fifth control mode, the reference current value IvTh is calculated by referring to the map for the fifth control mode. That is, the reference current value IvTh is set to a value that corresponds to the rotation angle of the output shaft of the second motor 51, the rotation speed of the crankshaft 14, and the target change amount X of the relative rotational phase immediately before the relative rotational phase starts being retarded through execution of the fifth control mode.

If it is immediately after the relative rotational phase has been retarded through execution of the fourth control mode at step S21, the ECU 100 determines whether the difference between the minimum value Ivmin of the current value and the reference current value IvTh (|Ivmin−IvTh|), that is, the difference related to the minimum value Ivmin of the current value, is less than a determination value ΔIv. If it is immediately after the relative rotational phase has been advanced through execution of the fourth control mode, the ECU 100 determines whether the difference between the maximum value Ivmax of the current value and the reference current value IvTh (|Ivmax−IvTh|), that is, the difference related to the maximum value Ivmax of the current value, is less than the determination value ΔIv. If it is immediately after the relative rotational phase has been retarded through execution of the fifth control mode, the ECU 100 determines whether the difference related to the minimum value Ivmin of the current value (|Ivmin−IvTh|) is less than the determination value ΔIv. In this case, if the difference related to the minimum value Ivmin of the current value or the difference related to the maximum value Ivmax of the current value is less than the determination value ΔIv, it is determined that the minimum value Ivmin of the current value substantially agrees with the reference current value IvTh or that the maximum value Ivmax of the current value substantially agrees with the reference current value IvTh. In contrast, if the difference related to the minimum value Ivmin of the current value or the difference related to the maximum value Ivmax of the current value is greater than or equal to the determination value ΔIv, it is determined that the minimum value Ivmin of the current value is largely displaced from the reference current value IvTh or that the maximum value Ivmax of the current value is largely displaced from the reference current value IvTh.

Thus, when the difference related to the minimum value Ivmin of the current value or the difference related to the maximum value Ivmax of the current value is less than the determination value ΔIv (step S21: YES), the ECU 100 determines that the variable valve lift mechanism 50 is normal (step S17) and ends the current process routine. In contrast, when the difference related to the minimum value Ivmin of the current value or the difference related to the maximum value Ivmax of the current value is greater than or equal to the determination value ΔIv (step S21: NO), the ECU 100 determines that the variable valve lift mechanism 50 has an abnormality (step S18) and ends the current process routine.

Next, operation will be described in which the relative rotational phase is changed, and abnormality diagnosis for the variable valve lift mechanism 50 is performed immediately after the completion of the change.

When the relative rotational phase is changed to the most retarded phase through execution of the first control mode, the drive signal duty cycle to the first motor 41, which is the drive source of the valve timing adjuster 40, is set to zero. As a result, when the relative rotational phase is changed through execution of the first control mode, the current value Iv at the first motor 41 becomes substantially zero. Then, the relative rotational phase is retarded at a rate that corresponds to the rotation speed of the crankshaft 14 and the maximum valve lift VL of the intake valves 21 at the time. The relative rotational phase is maintained at the most retarded phase, and the abnormality diagnosis for the variable valve lift mechanism 50 is performed. That is, by referring to the map for the first control mode, the reference rate-of-change value VATh is calculated that corresponds to the rotation speed of the crankshaft 14 and the rotation angle of the output shaft of the second motor 51 immediately before the relative rotational phase starts being retarded (step S15).

An estimated value of the maximum valve lift of the intake valves 21 immediately before the relative rotational phase starts being retarded is predicted based on the rotation angle of the output shaft the second motor 51, which is detected by the motor sensor 113. If the estimated value of the maximum valve lift substantially agrees with the actual maximum valve lift VL, the rate of change VA at which the relative rotational phase was being retarded substantially agrees with the reference rate-of-change value VATh (step S16: YES). As a result, the variable valve lift mechanism 50 is determined to be normal (step S17). In contrast, if the estimated value of the maximum valve lift is different from the actual maximum valve lift VL, the rate of change VA of the relative rotational phase is displaced from the reference rate-of-change value VATh (step S16: NO). As a result, the variable valve lift mechanism 50 is determined to have an abnormality (step S18).

When the rotation speed of the crankshaft 14 is out of the significantly high speed range and the relative rotational phase is changed to the most advanced phase through execution of the second control mode, the drive signal duty cycle is set to the duty cycle for the upper limit value, so that the current value Iv at the first motor 41 becomes the current upper limit value LimIv. Then, the relative rotational phase is advanced at a rate that corresponds to the rotation speed of the crankshaft 14 and the maximum valve lift VL of the intake valves 21 at the time. The relative rotational phase is maintained at the most advanced phase, and the abnormality diagnosis for the variable valve lift mechanism 50 is performed. That is, by referring to the map for the second control mode, the reference rate-of-change value VATh is calculated that corresponds to the rotation speed of the crankshaft 14 and the estimated value of the maximum valve lift of the intake valves 21 immediately before the relative rotational phase starts being advanced (step S15).

If the estimated value of the maximum valve lift immediately before the relative rotational phase starts being advanced substantially agrees with the actual maximum valve lift VL, the rate of change VA of the relative rotational phase when the relative rotational phase was being advanced substantially agrees with the reference rate-of-change value VATh (step S16: YES). As a result, the variable valve lift mechanism 50 is determined to be normal (step S17). In contrast, if the estimated value of the maximum valve lift is different from the actual maximum valve lift VL, the rate of change VA of the relative rotational phase is displaced from the reference rate-of-change value VATh (step S16: NO). As a result, the variable valve lift mechanism 50 is determined to have an abnormality (step S18).

Also, immediately after the rotation speed of the crankshaft 14 has entered the significantly high speed region, the relative rotational phase can be changed to the most retarded phase through execution of the second control mode. In this case also, the drive signal duty cycle is set to the duty cycle for the upper limit value, and the current value Iv at the first motor 41 becomes the current upper limit value LimIv. Then, the relative rotational phase is retarded at a rate that corresponds to the rotation speed of the crankshaft 14 and the maximum valve lift VL of the intake valves 21 at the time. The relative rotational phase is maintained at the most retarded phase, and the abnormality diagnosis for the variable valve lift mechanism 50 is performed. That is, by referring to the phase retarding map for the second control mode, the reference rate-of-change value VATh is calculated that corresponds to the rotation speed of the crankshaft 14 and the rotation angle of the output shaft of the second motor 51 immediately before the relative rotational phase starts being retarded (step S15).

If the estimated value of the maximum valve lift immediately before the relative rotational phase starts being retarded substantially agrees with the actual maximum valve lift VL, the rate of change VA of the relative rotational phase when the relative rotational phase was being retarded substantially agrees with the reference rate-of-change value VATh (step S16: YES). As a result, the variable valve lift mechanism 50 is determined to be normal (step S17). In contrast, if the estimated value of the maximum valve lift is different from the actual maximum valve lift VL, the rate of change VA of the relative rotational phase is displaced from the reference rate-of-change value VATh (step S16: NO). As a result, the variable valve lift mechanism 50 is determined to have an abnormality (step S18).

When the relative rotational phase is changed to the most retarded phase through execution of the third control mode, the drive signal duty cycle is set to the duty cycle for the lower limit value, so that the current value Iv at the first motor 41 becomes the current lower limit value LimIvA. Then, the relative rotational phase is retarded at a rate that corresponds to the rotation speed of the crankshaft 14 and the maximum valve lift VL of the intake valves 21 at the time. The relative rotational phase is maintained at the most retarded phase, and the abnormality diagnosis for the variable valve lift mechanism 50 is performed. That is, by referring to the map for the third control mode, the reference rate-of-change value VATh is calculated that corresponds to the rotation speed of the crankshaft 14 and the rotation angle of the output shaft of the second motor 51 immediately before the relative rotational phase starts being retarded (step S15).

If the estimated value of the maximum valve lift immediately before the relative rotational phase starts being retarded substantially agrees with the actual maximum valve lift VL, the rate of change VA of the relative rotational phase when the relative rotational phase was being retarded substantially agrees with the reference rate-of-change value VATh (step S16: YES). As a result, the variable valve lift mechanism 50 is determined to be normal (step S17). In contrast, if the estimated value of the maximum valve lift is different from the actual maximum valve lift VL, the rate of change VA of the relative rotational phase is displaced from the reference rate-of-change value VATh (step S16: NO). As a result, the variable valve lift mechanism 50 is determined to have an abnormality (step S18).

Also, when the relative rotational phase is retarded through execution of the fourth control mode, the drive signal duty cycle is changed, so that the current value Iv at the first motor 41 is monitored by the current sensor. When the retardation of the relative rotational phase is completed, the minimum value Ivmin of the current value when the relative rotational phase was being changed is obtained (step S19). By referring to the phase retarding map for the fourth control mode, the reference current value IvTh is calculated that corresponds to the rotation speed of the crankshaft 14 and the rotation angle of the output shaft of the second motor 51 immediately before the relative rotational phase starts being retarded and the target change amount X of the relative rotational phase in the current process (step S20).

If the estimated value of the maximum valve lift immediately before the relative rotational phase starts being retarded substantially agrees with the actual maximum valve lift VL, the minimum value Ivmin of the current value substantially agrees with the reference current value IvTh (step S21: YES). As a result, the variable valve lift mechanism 50 is determined to be normal (step S17). In contrast, if the estimated value of the maximum valve lift is different from the actual maximum valve lift VL, the minimum value Ivmin of the current value is displaced from the reference current value IvTh (step S21: NO). As a result, the variable valve lift mechanism 50 is determined to have an abnormality (step S18).

When the relative rotational phase is advanced through execution of the fourth control mode, the current value Iv through the first motor 41 is monitored. When the advancement of the relative rotational phase is completed, the maximum value Ivmax of the current value when the relative rotational phase was being changed is obtained (step S19). By referring to the phase advancing map for the fourth control mode, the reference current value IvTh is calculated that corresponds to the rotation speed of the crankshaft 14 and the rotation angle of the output shaft of the second motor 51 immediately before the relative rotational phase starts being advanced and the target change amount X of the relative rotational phase in the current process (step S20).

If the estimated value of the maximum valve lift immediately before the relative rotational phase starts being advanced substantially agrees with the actual maximum valve lift VL, the maximum value Ivmax of the current value substantially agrees with the reference current value IvTh (step S21: YES). As a result, the variable valve lift mechanism 50 is determined to be normal (step S17). In contrast, if the estimated value of the maximum valve lift is different from the actual maximum valve lift VL, the maximum value Ivmax of the current value is displaced from the reference current value IvTh (step S21: NO). As a result, the variable valve lift mechanism 50 is determined to have an abnormality (step S18).

Also, when the relative rotational phase is rapidly retarded through execution of the fifth control mode, the drive signal duty cycle is changed, so that the current value Iv at the first motor 41 is monitored by the current sensor. When the retardation of the relative rotational phase is completed, the minimum value Ivmin of the current value when the relative rotational phase was being retarded is obtained (step S19). By referring to the phase retarding map for the fifth control mode, the reference current value IvTh is calculated that corresponds to the rotation speed of the crankshaft 14 and the rotation angle of the output shaft of the second motor 51 immediately before the relative rotational phase starts being retarded and the target change amount X of the relative rotational phase in the current process (step S20).

If the estimated value of the maximum valve lift immediately before the relative rotational phase starts being retarded substantially agrees with the actual maximum valve lift VL, the minimum value Ivmin of the current value substantially agrees with the reference current value IvTh (step S21: YES). As a result, the variable valve lift mechanism 50 is determined to be normal (step S17). In contrast, if the estimated value of the maximum valve lift is different from the actual maximum valve lift VL, the minimum value Ivmin of the current value is displaced from the reference current value IvTh (step S21: NO). As a result, the variable valve lift mechanism 50 is determined to have an abnormality (step S18).

The above described configuration and operation have the following advantages.

(1) When the relative rotational phase is changed through execution of the first control mode, when the relative rotational phase is changed through execution of the second control mode, and when the relative rotational phase is changed through execution of the third control mode, abnormality diagnosis for the variable valve lift mechanism 50 is performed based on the rate of change VA and the reference rate-of-change value VATh, which corresponds to the rotation angle of the output shaft of the second motor 51 and the rotation speed of the crankshaft 14. Various parameters used in such abnormality diagnosis (that is, the rotation angle of the output shaft of the second motor 51, the rotation speed of the crankshaft 14, the current value Iv at the first motor 41, and the relative rotational phase) can be obtained through existing sensors. Thus, abnormality diagnosis for the variable valve lift mechanism 50 can be performed without providing a sensor dedicated for detecting the driven amount of the variable valve lift mechanism 50.

(2) When the relative rotational phase is retarded through execution of the fourth control mode and when the relative rotational phase is rapidly retarded through execution of the fifth control mode, abnormality diagnosis for the variable valve lift mechanism 50 is performed based on the minimum value Ivmin of the current value and the reference current value IvTh, which corresponds to the rotation angle of the output shaft of the second motor 51, the rotation speed of the crankshaft 14 and the target change amount X of the relative rotational phase. Various parameters used in such abnormality diagnosis (that is, the rotation angle of the output shaft of the second motor 51, the rotation speed of the crankshaft 14, the current value Iv at the first motor 41, and the relative rotational phase) can be obtained through existing sensors. Thus, abnormality diagnosis for the variable valve lift mechanism 50 can be performed without providing a sensor dedicated for detecting the driven amount of the variable valve lift mechanism 50.

(3) When the relative rotational phase is advanced through execution of the fourth control mode, abnormality diagnosis for the variable valve lift mechanism 50 is performed based on the maximum value Ivmax of the current value and the reference current value IvTh, which corresponds to the rotation angle of the output shaft of the second motor 51, the rotation speed of the crankshaft 14 and the target change amount X of the relative rotational phase. Various parameters used in such abnormality diagnosis (that is, the rotation angle of the output shaft of the second motor 51, the rotation speed of the crankshaft 14, the current value Iv at the first motor 41, and the relative rotational phase) can be obtained through existing sensors. Thus, abnormality diagnosis for the variable valve lift mechanism 50 can be performed without providing a sensor dedicated for detecting the driven amount of the variable valve lift mechanism 50.

(4) In the present embodiments, the abnormality diagnosis for the variable valve lift mechanism 50 is performed through selected one of the two methods. Therefore, regardless of which control mode is executed to change the relative rotational phase, a method appropriate for the control mode is selected to perform the abnormality diagnosis for the variable valve lift mechanism 50.

The above described embodiments may be modified as follows.

In the above illustrated embodiments, when the relative rotational phase is retarded through execution of the fourth control mode, the minimum value Ivmin of the current value at the first motor 41 is obtained, and the abnormality diagnosis for the variable valve lift mechanism 50 is performed based on the minimum value Ivmin of the current value and the reference current value IvTh. Instead of using the minimum value Ivmin of the current value, the integrated value of the current value Iv when the relative rotational phase is being retarded through execution of the fourth control mode may be obtained, and the abnormality diagnosis for the variable valve lift mechanism 50 may be performed based on the integrated value and the reference current value that corresponds to the rotation speed of the crankshaft 14, an estimated value of the maximum valve lift of the intake valves 21 and the target change amount X of the relative rotational phase. In this case, it may be configured such that the more likely the cam torque CT is to be increased, the greater the reference current value becomes. Even in this configuration, when the relative rotational phase is retarded through execution of the fourth control mode, the abnormality diagnosis for the variable valve lift mechanism 50 can be performed properly.

In the above illustrated embodiments, when the relative rotational phase is advanced through execution of the fourth control mode, the maximum value Ivmax of the current value at the first motor 41 is obtained, and the abnormality diagnosis for the variable valve lift mechanism 50 is performed based on the maximum value Ivmax of the current value and the reference current value IvTh. Instead of using the maximum value Ivmax of the current value, the integrated value of the current value Iv when the relative rotational phase is being advanced through execution of the fourth control mode may be obtained, and the abnormality diagnosis for the variable valve lift mechanism 50 may be performed based on the integrated value and the reference current value that corresponds to the rotation speed of the crankshaft 14, an estimated value of the maximum valve lift of the intake valves 21 and the target change amount X of the relative rotational phase. In this case, it may be configured such that the more likely the cam torque CT is to be increased, the greater the reference current value becomes. Even in this configuration, when the relative rotational phase is advanced through execution of the fourth control mode, the abnormality diagnosis for the variable valve lift mechanism 50 is properly performed.

In the above illustrated embodiments, when the relative rotational phase is rapidly retarded through execution of the fifth control mode, the minimum value Ivmin of the current value at the first motor 41 is obtained, and the abnormality diagnosis for the variable valve lift mechanism 50 is performed based on the minimum value Ivmin of the current value and the reference current value IvTh. Instead of using the minimum value Ivmin of the current value, the integrated value of the current value Iv when the relative rotational phase is being retarded through execution of the fifth control mode may be obtained, and the abnormality diagnosis for the variable valve lift mechanism 50 may be performed based on the integrated value and the reference current value that corresponds to the rotation speed of the crankshaft 14, an estimated value of the maximum valve lift of the intake valves 21 and the target change amount X of the relative rotational phase. In this case, it may be configured such that the more likely the cam torque CT is to be increased, the greater the reference current value becomes. Even in this configuration, when the relative rotational phase is retarded through execution of the fifth control mode, the abnormality diagnosis for the variable valve lift mechanism 50 can be performed properly.

In the above illustrated embodiments, when the relative rotational phase is retarded through execution of the first control mode, the maximum value of the phase retarding rate of the relative rotational phase is obtained as the rate of change VA. Instead of the maximum value of the phase retarding rate, any value that corresponds to the phase retarding rate when the relative rotational phase is being retarded may be obtained as the rate of change VA. For example, the average value of the phase retarding rate when the relative rotational phase is being retarded may be calculated, and the average value of the phase retarding rate may be obtained as the rate of change VA. Even in this case, the above described advantages (1) and (4) are achieved.

In the above illustrated embodiments, when the relative rotational phase is advanced through execution of the second control mode, the maximum value of the phase advancing rate of the relative rotational phase is obtained as the rate of change VA. Instead of the maximum value of the phase advancing rate, any value that corresponds to the phase advancing rate when the relative rotational phase is being advanced may be obtained as the rate of change VA. For example, the average value of the phase advancing rate when the relative rotational phase is being advanced may be calculated, and the average value of the phase advancing rate may be obtained as the rate of change VA. Even in this case, the above described advantages (1) and (4) are achieved.

In the above illustrated embodiments, when the relative rotational phase is retarded through execution of the second control mode, the maximum value of the phase retarding rate of the relative rotational phase is obtained as the rate of change VA. Instead of the maximum value of the phase retarding rate, any value that corresponds to the phase retarding rate when the relative rotational phase is being retarded may be obtained as the rate of change VA. For example, the average value of the phase retarding rate when the relative rotational phase is being retarded may be calculated, and the average value of the phase retarding rate may be obtained as the rate of change VA. Even in this case, the above described advantages (1) and (4) are achieved.

In the above illustrated embodiments, when the relative rotational phase is rapidly retarded through execution of the third control mode, the maximum value of the phase retarding rate of the relative rotational phase is obtained as the rate of change VA. However, instead of the maximum value of the phase retarding rate, any value that corresponds to the phase retarding rate when the relative rotational phase is being retarded may be obtained as the rate of change VA. For example, the average value of the phase retarding rate when the relative rotational phase is being retarded may be calculated, and the average value of the phase retarding rate may be obtained as the rate of change VA. Even in this case, the above described advantages (1) and (4) are achieved.

In a case in which the internal combustion engine 10 includes a valve timing adjuster and a variable valve lift mechanism for exhaust valves, abnormality diagnosis for the variable valve lift mechanism for the exhaust valves may be performed immediately after the relative rotational phase of the camshaft for the exhaust valves has been changed relative to the crankshaft 14. In this case, by performing the abnormality diagnosis in the same method as that of the abnormality diagnosis for the variable valve lift mechanism 50 for the intake valves 21, which is described in the above illustrated embodiment, the same advantages (1) to (4) are achieved.

Therefore, the present examples and embodiments are to be considered as illustrative and not restrictive and the claimed subject matter is not to be limited to the details given herein, but may be modified within the scope and equivalence of the appended claims.

The invention claimed is:

1. A controller for controlling an internal combustion engine that includes a valve timing adjuster, which adjusts a relative rotational phase, which is a rotational phase of a camshaft relative to an engine output shaft, by using a first motor, and a variable valve lift mechanism, which changes a maximum valve lift of an engine valve by using a second motor, the controller comprising:
   a motor sensor, which detects a rotation angle of an output shaft of the second motor; and
   a processor, which controls a duty cycle of a drive signal delivered to the first motor, thereby driving the valve timing adjuster, wherein
   when a positive current is supplied to the first motor, an output shaft of the first motor rotates in a first direction, which is a direction for advancing the relative rotational phase,
   when a negative current is supplied to the first motor, the output shaft of the first motor rotates in a second direction, which is a direction opposite to the first direction,
   the processor is configured to control the duty cycle of the drive signal in a selected one of a plurality of control modes, thereby changing the relative rotational phase, the plurality of control modes includes a specific control mode in which the duty cycle of the drive signal is adjusted to change a value of the current through the first motor,
   the processor is configured to perform, when changing the relative rotational phase through execution of the specific control mode, an abnormality diagnosis for the variable valve lift mechanism based on a comparison between the value of the current through the first motor and a reference current value, and the processor is configured to set the reference current value in accordance with the rotation angle of the output shaft of the second motor, which is detected by the motor sensor.

2. The controller according to claim 1, wherein
the plurality of control modes includes a first control mode for setting the duty cycle of the drive signal to zero,
the processor is configured to perform, when changing the relative rotational phase through execution of the first control mode, the abnormality diagnosis for the variable valve lift mechanism based on comparison between a rate of change of the relative rotational phase and a reference rate-of-change value, and
the processor is configured to set the reference rate-of-change value in accordance with the rotation angle of the output shaft of the second motor, which is detected by the motor sensor.

3. The controller according to claim 2, wherein
a rotation direction of the output shaft of the second motor for increasing the maximum valve lift of the engine valve is a forward direction, and
the processor is configured to adjust, when retarding the relative rotational phase through execution of the first control mode, the reference rate-of-change value such that the greater the rotation angle in the forward direction of the output shaft of the second motor, which is detected by the motor sensor, the greater the reference rate-of-change value becomes.

4. The controller according to claim 2, wherein
the processor is configured to set, when changing the relative rotational phase through execution of the first control mode, the reference rate-of-change value to a value corresponding to a rotation speed of the engine output shaft.

5. The controller according to claim 1, wherein
the plurality of control modes includes a second control mode and a third control mode, wherein the second control mode is for setting the duty cycle of the drive signal to a value different from zero such that the value of the current through the first motor becomes equal to a current upper limit value, which is greater than zero, and the third control mode is for setting the duty cycle of the drive signal to a value different from zero such that the value of the current through the first motor becomes equal to a current lower limit value, which is lower than zero,
the processor is configured to perform, when changing the relative rotational phase through execution of the second control mode or the third control mode, the abnormality diagnosis for the variable valve lift mechanism based on comparison between a rate of change of the relative rotational phase and a reference rate-of-change value, and
the processor is configured to set the reference rate-of-change value in accordance with the rotation angle of the output shaft of the second motor, which is detected by the motor sensor.

6. The controller according to claim 5, wherein
a rotation direction of the output shaft of the second motor for increasing the maximum valve lift of the engine valve is a forward direction, and
the processor is configured to adjust, when advancing the relative rotational phase through execution of the second control mode, the reference rate-of-change value such that the greater the rotation angle in the forward direction of the output shaft of the second motor, which is detected by the motor sensor, the smaller the reference rate-of-change value becomes.

7. The controller according to claim 5, wherein
a rotation direction of the output shaft of the second motor for increasing the maximum valve lift of the engine valve is a forward direction, and
the processor is configured to adjust, when retarding the relative rotational phase through execution of the second control mode, the reference rate-of-change value such that the greater the rotation angle in the forward direction of the output shaft of the second motor, which is detected by the motor sensor, the greater the reference rate-of-change value becomes.

8. The controller according to claim 5, wherein
a rotation direction of the output shaft of the second motor for increasing the maximum valve lift of the engine valve is a forward direction, and
the processor is configured to adjust, when retarding the relative rotational phase through execution of the third control mode, the reference rate-of-change value such that the greater the rotation angle in the forward direction of the output shaft of the second motor, which is detected by the motor sensor, the greater the reference rate-of-change value becomes.

9. The controller according to claim 5, wherein
the processor is configured to set, when changing the relative rotational phase through execution of the second control mode or the third control mode, the reference rate-of-change value to a value corresponding to a rotation speed of the engine output shaft.

10. The controller according to claim 1, wherein
the plurality of control modes includes a positive current adjusting control mode, in which the duty cycle of the drive signal is adjusted to change the value of the current through the first motor in a range greater than zero,
the processor is configured to perform, when retarding the relative rotational phase through execution of the positive current adjusting control mode, the abnormality diagnosis for the variable valve lift mechanism based on comparison between a minimum value of the current through the first motor when the relative rotational phase is being retarded and the reference current value,
a rotation direction of the output shaft of the second motor for increasing the maximum valve lift of the engine valve is a forward direction, and
the processor is configured to adjust, when retarding the relative rotational phase through execution of the positive current adjusting control mode, the reference current value such that the greater the rotation angle in the forward direction of the output shaft of the second motor, which is detected by the motor sensor, the greater the reference current value becomes.

11. The controller according to claim 1, wherein
the plurality of control modes includes a positive current adjusting control mode, in which the duty cycle of the drive signal is adjusted to change the value of the current through the first motor in a range greater than zero,
the processor is configured to perform, when retarding the relative rotational phase through execution of the positive current adjusting control mode, the abnormality diagnosis for the variable valve lift mechanism based on comparison between a minimum value of the current through the first motor when the relative rotational phase is being retarded and the reference current value, and the processor adjusts, when retarding the relative rotational phase through execution of the positive current adjusting control mode, the reference current value such that the greater a target change amount of the relative rotational phase, the smaller the reference current value becomes.

12. The controller according to claim 1, wherein the plurality of control modes includes a positive current adjusting control mode, in which the duty cycle of the drive signal is adjusted to change the value of the current through the first motor in a range greater than zero, the processor is configured to perform, when advancing the relative rotational phase through execution of the positive current adjusting control mode, the abnormality diagnosis for the variable valve lift mechanism based on comparison between a maximum value of the current through the first motor when the relative rotational phase is being advanced and the reference current value, a rotation direction of the output shaft of the second motor for increasing the maximum valve lift of the engine valve is a forward direction, and the processor is configured to adjust, when advancing the relative rotational phase through execution of the positive current adjusting control mode, the reference current value such that the greater the rotation angle in the forward direction of the output shaft of the second motor, which is detected by the motor sensor, the greater the reference current value becomes.

13. The controller according to claim 1, wherein the plurality of control modes includes a positive current adjusting control mode, in which the duty cycle of the drive signal is adjusted to change the value of the current through the first motor in a range greater than zero, the processor is configured to perform, when advancing the relative rotational phase through execution of the positive current adjusting control mode, the abnormality diagnosis for the variable valve lift mechanism based on comparison between a maximum value of the current through the first motor when the relative rotational phase is being advanced and the reference current value, and the processor is configured to adjust, when advancing the relative rotational phase through execution of the positive current adjusting control mode, the reference current value such that the greater a target change amount of the relative rotational phase, the greater the reference current value becomes.

14. The controller according to claim 1, wherein the plurality of control modes includes a negative current adjusting control mode, in which the duty cycle of the drive signal is adjusted to change the value of the current through the first motor in a range lower than zero, the processor is configured to perform, when retarding the relative rotational phase through execution of the negative current adjusting control mode, the abnormality diagnosis for the variable valve lift mechanism based on comparison between a minimum value of the current through the first motor when the relative rotational phase is being retarded and the reference current value, and the processor is configured to adjust, when retarding the relative rotational phase through execution of the negative current adjusting control mode, the reference current value such that the greater the rotation angle in the forward direction of the output shaft of the second motor, which is detected by the motor sensor, the greater the reference current value becomes.

15. The controller according to claim 1, wherein the plurality of control modes includes a negative current adjusting control mode, in which the duty cycle of the drive signal is adjusted to change the value of the current through the first motor in a range lower than zero, the processor is configured to perform, when retarding the relative rotational phase through execution of the negative current adjusting control mode, the abnormality diagnosis for the variable valve lift mechanism based on comparison between a minimum value of the current through the first motor when the relative rotational phase is being retarded and the reference current value, and the processor is configured to adjust, when retarding the relative rotational phase through execution of the negative current adjusting control mode, the reference current value such that the greater a target change amount of the relative rotational phase, the smaller the reference current value becomes.

16. The controller according to claim 1, wherein the processor is configured to set, when changing the relative rotational phase through execution of the specific control mode, the reference current value to a value corresponding to a rotation speed of the engine output shaft.

17. A controller for controlling an internal combustion engine that includes a valve timing adjuster, which adjusts a relative rotational phase, which is a rotational phase of a camshaft relative to an engine output shaft, by using a first motor, and a variable valve lift mechanism, which changes a maximum valve lift of an engine valve by using a second motor, the controller comprising:

a motor sensor, which detects a rotation angle of an output shaft of the second motor; and a processor, which controls a duty cycle of a drive signal delivered to the first motor, thereby driving the valve timing adjuster, wherein when a positive current is supplied to the first motor, an output shaft of the first motor rotates in a first direction, which is a direction for advancing the relative rotational phase, when a negative current is supplied to the first motor, the output shaft of the first motor rotates in a second direction, which is a direction opposite to the first direction, the processor is configured to control the duty cycle of the drive signal in a control mode to change the relative rotational phase, the processor is configured to perform, when changing the relative rotational phase through execution of the control mode, an abnormality diagnosis for the variable valve lift mechanism based on a comparison between a rate of change of the relative rotational phase and a reference rate-of-change value, and the processor is configured to set the reference rate-of-change value in accordance with the rotation angle of the output shaft of the second motor, which is detected by the motor sensor.

18. The controller according to claim 17, wherein the processor is configured to set, when changing the relative rotational phase through execution of the control mode, the reference rate-of-change value in accordance with a rotation speed of the engine output shaft.

* * * * *